(12) United States Patent
Chappellet

(10) Patent No.: US 10,696,795 B2
(45) Date of Patent: Jun. 30, 2020

(54) PHOTOALIGNING MATERIALS

(71) Applicant: ROLIC TECHNOLOGIES AG, Allschwil (CH)

(72) Inventor: Sabrina Chappellet, Village-Neuf (FR)

(73) Assignee: ROLIC TECHNOLOGIES AG, Allschwil (CH)

( * ) Notice: Subject to any disclaimer, the term of this patent is extended or adjusted under 35 U.S.C. 154(b) by 0 days.

(21) Appl. No.: 15/772,986

(22) PCT Filed: Nov. 9, 2016

(86) PCT No.: PCT/EP2016/077077
§ 371 (c)(1),
(2) Date: May 2, 2018

(87) PCT Pub. No.: WO2017/081056
PCT Pub. Date: May 18, 2017

(65) Prior Publication Data
US 2018/0319939 A1    Nov. 8, 2018

(30) Foreign Application Priority Data

Nov. 11, 2015  (EP) .................... 15194024

(51) Int. Cl.
| | |
|---|---|
| C08G 77/385 | (2006.01) |
| C08G 77/388 | (2006.01) |
| C08G 77/38 | (2006.01) |
| C08L 77/00 | (2006.01) |
| C08L 79/08 | (2006.01) |
| G02F 1/1337 | (2006.01) |

(52) U.S. Cl.
CPC ........... *C08G 77/385* (2013.01); *C08G 77/38* (2013.01); *C08G 77/388* (2013.01); *C08L 77/00* (2013.01); *C08L 79/08* (2013.01); *G02F 1/133711* (2013.01); *Y10T 428/10* (2015.01); *Y10T 428/1005* (2015.01); *Y10T 428/1014* (2015.01); *Y10T 428/1023* (2015.01)

(58) Field of Classification Search
CPC .... C08G 77/385; C08G 77/045; C08G 77/38; C08G 77/388; C08L 77/388; C08L 77/00; C08L 79/08; G02F 1/133711; G02F 1/1337; G02F 1/133719; G02F 1/133723; G02F 1/133788; Y10T 428/10; Y10T 428/1005; Y10T 428/1014; Y10T 428/1023
USPC ........ 428/1.1, 1.2, 1.23, 1.26; 349/123, 131; 528/27, 42
See application file for complete search history.

(56) References Cited

U.S. PATENT DOCUMENTS

| | | | |
|---|---|---|---|
| 3,080,418 | A | 3/1963 | Sullivan |
| 6,277,502 | B1 | 8/2001 | Buchecker |
| 6,340,506 | B1 | 1/2002 | Buchecker et al. |
| 2012/0114907 | A1 | 5/2012 | Eckert et al. |

FOREIGN PATENT DOCUMENTS

| | | |
|---|---|---|
| DE | 1 078 120 B | 9/1958 |
| GB | 872355 A | 7/1961 |
| JP | 58-109479 A | 6/1983 |
| JP | 59-190945 A | 10/1984 |
| JP | 60-13740 A | 1/1985 |
| JP | 4458299 B2 | 4/2010 |
| JP | 2011-132494 A | 7/2011 |
| JP | 2011132494 A * | 7/2011 |
| WO | 00/59966 A1 | 10/2000 |
| WO | 01/53384 A1 | 7/2001 |
| WO | 2009/017240 A1 | 2/2009 |
| WO | WO-2009017240 A1 * | 2/2009 ............ C08G 77/20 |
| WO | 2013/050121 A1 | 4/2013 |

OTHER PUBLICATIONS

Database WPI, Week 200919, Thomson Scientific, London, GB, AN 2009-F00564, XP002754279, 1 page.
Database WPI, Week 200919, Thomson Scientific, London, GB, AN 2011-H65369, XP002754280, 1 page.
International Search Report for PCT/EP2016/077077, dated Dec. 6, 2016 (PCT/ISA/210).
Written Opinion of the International Searching Authority for PCT/EP2016/077077, dated Dec. 6, 2016 (PCT/ISA/237).

* cited by examiner

*Primary Examiner* — Ruiyun Zhang
(74) *Attorney, Agent, or Firm* — Sughrue Mion, PLLC

(57) ABSTRACT

The present invention relates to siloxane polymer, copolymer or oligomer for the photoalignment of liquid crystals, especially for the planar orientation of liquid crystals, and which derives from at least one monomer of formula (I), to compositions thereof, to a process for the preparation of the linear, branched or crosslinked siloxane polymer, and to its use for optical and electro optical devices, such as liquid crystal devices (LCDs):

(Formula I)

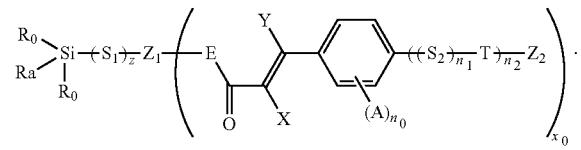

19 Claims, No Drawings

PHOTOALIGNING MATERIALS

CROSS REFERENCE TO RELATED APPLICATIONS

This application is a National Stage of International Application No. PCT/EP2016/077077 filed Nov. 9, 2016, claiming priority based on European Patent Application No. 15194024.4, filed Nov. 11, 2015.

The present invention relates to a siloxane oligomer, polymer or copolymer for the photoalignment of liquid crystals, namely for the planar orientation of liquid crystals or for the vertical alignment of liquid crystals, and to a process for preparing such a siloxane oligomer, polymer or copolymer. Further the present invention relates to compositions comprising said polymer, and to its use for optical and electro-optical devices, such as liquid crystal devices (LCDs).

Several photo-aligning materials are already known in the art but there is still the demand to develop new photo-aligning materials having better optical qualities for the use for example in electro-optical applications. One example of such photo-aligning material is described in WO2013/050121 A1.

In the present invention new photo-aligning materials of formula (I) with superior optical properties are described. These photo-aligning materials give access to an economic manufacturing process and low energy consuming LCDs without decreasing the required technical properties. The present invention also provides a technologically implementable and economically favourable process for the production of the siloxane oligomer, polymer or copolymer of formula (I).

SUMMARY OF THE INVENTION

It is a first object of the present invention to provide a siloxane oligomer, polymer or copolymer comprising a monomer as described by formula (I) in its polymerized form.

It is a second object of the present invention to provide a composition comprising at least one said siloxane oligomer, polymer or copolymer and a second polymer which is different from the first one, and optionally an additive.

It is a third object of the present invention to provide a process for the preparation of said siloxane oligomer, polymer or copolymer.

It is a fourth object of the present invention to provide an orientation layer comprising one said siloxane oligomer, polymer or copolymer, preferably further comprising a polymerisable liquid crystal or a polymerized liquid crystal.

It is a fifth object of the present invention to provide a method for preparing the orientation layer comprising said siloxane oligomer, polymer or copolymer and to orientation layers obtained by such method.

It is a sixth object of the present invention to provide the use of said orientation layer to align liquid crystals, namely for the in plane switching (IPS) of liquid crystals or for the vertical alignment of liquid crystals, or for the alignment of liquid crystals comprising polymerizable liquid crystals, or for the alignment of liquid crystals which are sandwiched between a pair of said orientation layers.

It is an seventh object of the present invention to provide a method for manufacturing a liquid crystal display comprising said photoaligning material or said orientation layer.

It is an eight object of the present invention to provide optical or electro-optical unstructured or structured elements comprising said siloxane oligomer, polymer or copolymer, or said orientation layer.

DETAILED DESCRIPTION OF THE INVENTION

Thus, the present invention relates in a first aspect to a siloxane oligomer, polymer or copolymer for the photoalignment of liquid crystals, namely for the planar orientation of liquid crystals or for the vertical alignment of liquid crystals, and which derives from or comprises at least one monomer of formula (I):

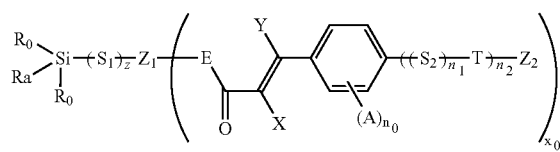

wherein, $R_a$ represents OH, Cl, substituted or unsubstituted alkoxyl group having 1 to 20 carbons, alkyl group having 1 to 20 carbons, or aryl group having 1 to 20 carbons;

$S_1$ represents a single bond or a straight-chain or branched, substituted or unsubstituted $C_1$-$C_{24}$ alkylen, especially $C_1$-$C_{12}$ alkylen, more especially $C_1$-$C_8$ alkylen, more especially $C_1$-$C_6$ alkylen, most especially $C_1$-$C_4$ alkylen, most especially $C_1$-$C_2$ alkylen in which one or more —C—, —CH—, $CH_2$— groups may be replaced by a linking group;

z is an integer from 0 to 15, preferably from 1 to 10, more preferably from 1 to 8, more preferably from 1 to 5, even more preferably from 1 to 3, most preferred n is 1;

$Z_1$ represents a single bond, or substituted or unsubstituted aliphatic or alicyclic group of $C_3$ to $C_{12}$, more preferably $C_3$ to $C_{10}$, even more preferably $C_5$ to $C_8$, most preferably $C_5$ to $C_6$.

$n_0$ is an integer from 0 to 4, preferably from 0 to 2; even more preferably from 1 to 2;

$n_1$ is an integer from 0 to 15, preferably from 1 to 10, more preferably from 1 to 8, more preferably from 1 to 5, most preferably from 1 to 3, most preferred n is 1;

$n_2$ is an integer from 1 to 15, preferably from 1 to 10, more preferably from 1 to 8, more preferably from 1 to 5, most preferably from 1 to 3, most preferred n is 1;

$x_0$ is an integer from 1 to 2;

X, Y each independently from each other represents H, F, Cl, CN;

$S_2$ represents a cyclic, aromatic, straight-chain or branched, substituted or unsubstituted $C_1$-$C_{24}$ alkylen, especially $C_1$-$C_{12}$ alkylen, more especially $C_1$-$C_8$ alkylen, more especially $C_1$-$C_6$ alkylen, most especially $C_1$-$C_4$ alkylen, most especially $C_1$-$C_2$ alkylen in which one or more —C—, —CH—, —$CH_2$— groups may be replaced by a linking group, wherein if more than one —C—, —CH—, —$CH_2$— group is replaced, the linking groups may be the same or different;

E represents O, S, NH, C($C_1$-$C_6$ alkyl), $NR^4$, OC, OOC, OCONH, OCON$R^4$, SCS, SC, wherein $R^4$ is cyclic, straight chain or branched, substituted or unsubstituted $C_1$-$C_{24}$ alkyl wherein one or more —C—, —CH—, —CH$_2$— group(s) may be independently from each other be replaced by a linking group;

A represents halogen, H or substituted or unsubstituted C$_1$-C$_{24}$ alkyl, a substituted or unsubstituted C$_1$-C$_{24}$ alkenyl, a substituted or unsubstituted C$_1$-C$_{24}$ alkynyl, or a carboxylic acid, wherein one or more, —C—, —CH—, —CH$_2$—, group may independently from each other be replaced by a heteroatom; preferably A is halogen, H, substituted or unsubstituted C$_1$-C$_{24}$ alkyl or a C$_1$-C$_{24}$ alkoxy or a carboxylic acid; most preferably A is H, F, C$_1$-C$_6$ alkyl, C$_1$-C$_6$ alkoxy or a carboxylic acid;

R$_0$ represents OH, Cl, a linear or branched, substituted or unsubstituted alkoxyl group having 1 to 20 carbons, in which a —C—, —CH—, —CH$_2$— could be replaced by unsubstituted or substituted C$_6$-C$_{20}$ aryl group;

Z$_2$ represents a chemical group having a delocalisation of its electronical density and/or inducing a delocalisation of the electronical density of its neighboring atom; and T represents a single bond or an unsubstituted or substituted, straight-chain C$_1$-C$_{16}$ alkyl.

In the context of the present invention the term "polymer" denotes linear, branched or crosslinked homo- or copolymer or oligomer.

The term "linking group", as used in the context of the present invention is preferably selected from an unsubstituted or substituted alicyclic group, preferably cyclohexylen, or an unsubstituted or substituted aromatic group, single bond, heteroatom, cationic carbohydrogen group such as —(C+)-, —O—, —CO, -arylen-, —CO—O—, —O—CO—,

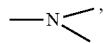

—CN, —NR$^1$—, —NR$^1$—CO—, —CO—NR$^1$—, —NR$^1$—CO—O—, —O—CO—NR$^1$—, —NR$^1$—CO—NR$^1$—, —CH═CH—, —C≡C—, —O—CO—O—, and —Si(CH$_3$)$_2$—O—Si(CH$_3$)$_2$—, and wherein:

R$^1$ represents a hydrogen atom or C$_1$-C$_6$alkyl;

with the proviso that oxygen atoms of linking groups are not directly linked to each other.

Substituents of the substituted alicyclic or aromatic group of the linking groups may be one or more and are preferably halogene, such as fluor, chloro, bromo, iodo, and preferably fluoro and/chloro and more preferably fluor; or C$_1$-C$_6$ alkoxy, such as preferably methoxy, or trifluoromethyl.

In a preferred embodiment S$_2$ represents a single bond or a spacer unit, which is a cyclic, straight-chain or branched, substituted or unsubstituted C$_1$-C$_{24}$ alkylen, especially C$_1$-C$_{12}$ alkylen, especially C$_1$-C$_8$ alkylen, more especially C$_1$-C$_6$ alkylen, most especially C$_1$-C$_4$ alkylen; in which one or more, preferably non-adjacent, —C—, —CH—, —CH$_2$— group may be replaced by a linking group, wherein the linking group is preferably an unsubstituted or substituted alicyclic group, preferably cyclohexylen, or an unsubstituted or substituted aromatic group, preferably phenylene or naphtalene, single bond, heteroatom, —O—, —CO, -arylen-, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH═CH—, —C≡C—, —O—CO—O— and wherein:

R$^1$ represents a hydrogen atom or C$_1$-C$_6$alkyl; and more preferably an unsubstituted or substituted cyclohexylen, or an unsubstituted or substituted phenylen, single bond, —O—, —CO, -arylen-, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH═CH—, —C≡C—, —O—CO—O— and wherein:

R$^1$ represents a hydrogen atom or C$_1$-C$_6$alkyl, with the proviso that oxygen atoms of linking groups are not directly linked to each other; or/and C$_1$-C$_{24}$ alkylen, in which one or more, preferably non-adjacent, —C—, —CH—, —CH$_2$— group may be unreplaced or at least once replaced by a non-aromatic, aromatic, unsubstituted or substituted carbocyclic or heterocyclic group connected via bridging groups; and, wherein if more than one —C—, —CH—, —CH$_2$— group is replaced, the linking groups may be the same or different.

More preferably, S$_2$ is a single bond, straight-chain or branched, substituted or unsubstituted C$_1$-C$_8$ alkylen, more especially C$_1$-C$_6$ alkylen, most especially C$_1$-C$_4$ alkylen within the above-given preferences; in which one or more, preferably non-adjacent, —C—, —CH—, —CH$_2$— group may be unreplaced or at least once replaced by an unsubstituted or substituted alicyclic group, preferably cyclohexylen, or an unsubstituted or substituted aromatic group, single bond, heteroatom, —O—, —CO, -arylen-, —CO—O—, —O—CO—, —O—CO—O—; and more preferably by an unsubstituted or substituted cyclohexylen, or an unsubstituted or substituted phenylen, single bond, —O—, —CO, -arylen-, —CO—O—, —O—CO—, —O—CO—O—:

with the proviso that oxygen atoms of linking groups are not directly linked to each other.

Substituents of the aromatic, alicyclic group or phenylene, cylohexylen or the carbocyclic or heterocyclic group S$_2$ are preferably, at least one halogen, such as preferably chloro or fluoro, trifluoromethyl, C$_1$-C$_6$alkoxy, preferably methoxy, ethoxy, propoxy, butoxy, pentoxy, hexoxy.

More preferably, S$_2$ is substituted or unsubstituted C$_6$-C$_{12}$ aromatic ring, or two C$_6$ aromatic rings connected by a single bond, or an alicyclic C$_6$ ring.

It is further encompassed by the present invention that if S$_2$ comprises an aromatic group, then the bonds to the remaining of the molecule can occur at any carbon atom of the aromatic ring.

More preferably S$_1$ is a single bond or a straight-chain or branched substituted or unsubstituted C$_1$-C$_{24}$ alkylen in which one or more preferably non-adjacent —C—, —CH—, —CH$_2$— group may be replaced by an heteroatom, a non-aromatic, aromatic, unsubstituted or substituted carbocyclic or heterocyclic group or —(CH$_2$)$_{n1}$—, —(CH$_2$)$_{n1}$—O—(CH$_2$)$_{n1}$—, —(CH$_2$)$_{n1}$—O(OC)—(CH$_2$)$_{n1}$—, —(CH$_2$)$_{n1}$—(OC)O—(CH$_2$)$_{n1}$—, —(CH$_2$)$_{n1}$—NH—(CH$_2$)$_{n1}$—, —(CH$_2$)$_{n1}$—NH(OC)—(CH$_2$)$_{n1}$—, —(CH$_2$)$_{n1}$—(OC)NH—(CH$_2$)$_{n1}$—, —(CH$_2$)$_{n1}$—S—(CH$_2$)$_{n1}$—, —(CH$_2$)$_{n1}$—S(SC)—(CH$_2$)$_{n1}$—, —(CH$_2$)$_{n1}$—(SC)NH—(CH$_2$)$_{n1}$—, —(CH$_2$)$_{n1}$—NH(CS)—(CH$_2$)$_{n1}$—, —(CH$_2$)$_{n1}$—(SC)S—(CH$_2$)$_{n1}$—, —(CH$_2$)$_{n1}$—NHCONH—(CH$_2$)$_{n1}$—, —(CH$_2$)$_{n1}$—NHCSNH—(CH$_2$)$_{n1}$—, —(CH$_2$)$_{n1}$—O(CO)O—(CH$_2$)$_{n1}$—, —(CH$_2$)$_{n1}$—OCONH—(CH$_2$)$_{n1}$—, —(CH$_2$)$_{n1}$—NHOCO—(CH$_2$)$_{n1}$—, wherein n1 is independently from each other 0, 1, 2, 3, 4, 5, 6, 7, 8, 9, 10, 11, 12, preferably 0, 1, 2, 3, 4, 5, 6, 7, 8, more preferably 0, 1, 2, 3, 4, and most preferably 0, 1 or 2.

Most preferably S, is a single bond, a straight-chain $C_1$-$C_{24}$ alkylen, cyclohexylene, phenylene or —$(CH_2)_{n1}$—, —$(CH_2)_{n1}$—O(OC)—$(CH_2)_{n1}$—, —$(CH_2)_{n1}$—NH(CO)O—$(CH_2)_{n1}$—.

Preferably $S_1$ is a straight-chain $C_1$-$C_{24}$alkylen, preferably a $C_1$-$C_{12}$ alkylen, more preferably a $C_1$-$C_6$ alkylen, even more preferably a $C_1$-$C_4$ alkylen, most preferred a $C_1$-$C_2$ alkylen, even most preferred S, is an ethyl group.

In the context of the present invention the wording "chemical group having a delocalisation of its electronical density and/or inducing a delocalisation of the electronical density of its neighboring atom" means a "polar group". A polar group represents a chemical group having an asymmetrical electronic density distribution.

More preferably the polar group is selected from the group consisting of:
- groups containing oxygen, preferably hydroxy, carbonyl, such as a ketone or aldehyde group, carbonate ester, carboxylate, carboxyl acid, carboxyl ester, ether, such as $C_1$-$C_6$ alkoxy, acetal or ketal group, orthocarbonate ester,
- groups containing cations, anions, salts;
- groups containing nitrogene, preferably carboxamide, primary amine, secondary amine, such as di-($C_1$-$C_{16}$ alkyl)amino, tertiary amine, ammonium ion, primary ketimine, secondary ketimine, primary aldimine, secondary aldimine, aminocarbonyl, imide, azide, azo, cyanate, isocyanate, nitrate, nitrile, isonitrile, nitrosooxy, nitro, nitroso, pyridyl,
- groups containing sulfur, preferably sulfhydryl, sulfide, disulfide, sulfinyl, sulfonyl, sulfino, sulfo, thiocyanate, isothiocyanate, carbonothioyl
- groups containing phosphorus, preferably phosphino, phosphono, phosphate,
- unsubstituted or substituted, branched alkyl, wherein it may be at least one —C—, —CH—, or —$CH_2$— group be unreplaced or replaced by a heteroatom such as —O—, —S—, or by a primary, secondary, tertiary or quartinary nitrogen, which is the ammonium cation; preferably isopropyl, tert-butyl, sec-butyl, neopentyl, isopentyl;
- unsubstituted or substituted, straight-chain alkyl, wherein at least one —C—, —CH—, or —$CH_2$— group is replaced by a heteroatom or by a primary, secondary, tertiary or quartinary nitrogen, which is the ammonium cation;
- unsubstituted or substituted straight-chain or branched alkenyl, wherein one or more —C—, —CH—, —$CH_2$— group(s) may be independently from each other unreplaced or replaced by a linking group, and preferably wherein the -en-group is in the terminal position of the alkenyl group, especially —O-alkenyl, —OOC-alkenyl, —OCO-alkenyl, —OCNHalkenyl, —NHCOalkenyl, which is preferably alkylacryloyloxy, preferably methacryloyloxy, acryloyloxy, vinyl, vinyloxy, allyl, allyloxy;
- unsubstituted or substituted straight-chain or branched alkynyl, wherein at least one —C—, —CH—, or —$CH_2$— group be unreplaced or replaced by a linking group, and preferably wherein the yl-group is in the terminal position of the alkynyl group, especially —O-alkynyl, —OOC-alkynyl, —OCO-alkynyl, —OCNHalkynyl, —NHCOalkynyl, which is preferably —≡—, —≡—$CH_3$, acetyl;
- unsubstituted or substituted carbocyclic or heterocyclic aromatic group or alicyclic group, incorporating preferably five, six, ten to 14 ring atoms, e.g. furan, benzyl or phenyl, pyridinyl, pyridinium cation, pyrimidinyl, pyrimidinium cation, naphthyl, which may form ring assemblies, such as biphenylyl or triphenyl, which are uninterrupted or interrupted by at least a single heteroatom and/or at least a single bridging group; or fused polycyclic systems, such as phenanthryl, tetralinyl. Preferably aromatic group are benzyl, phenyl, biphenyl or triphenyl.

More preferred aromatic groups are benzyl, phenyl and biphenyl; further
- unsubstituted or substituted alicyclic group is preferably a non-aromatic carbocyclic or heterocyclic group, wherein heterocyclic group denotes a carbocyclic group, wherein at least one —C—, —CH—, or —$CH_2$— group is unreplaced or replaced by a heteroatom such as —O—, —S—, or by a primary, secondary, tertiary or quartinary nitrogen, which is the ammonium cation; and preferably the alicyclic group is a ring system, with 3 to 30 carbon atoms, and preferably cyclopropyl, cyclobutyl, cyclopentyl, cyclopentyl, cyclohexyl, cyclohexyl, cyclohexadienyl, decalinyl, aziridinyl, oxiranyl, azrinyl, aziridium cation, oxirenyl, thiirenyl, diazirine diaziridium cation, oxaziridinyl, oxaziridium cation, dioxiranyl, azetidinyl, azetinium cation azete, azetidin cation, oxetanyl, oxetyl, thietanyl, thietyl, diazetidinyl, diazetidinium cation, dioxetanyl, dioxetyl, dithietanyl, dithietyl, oxolanyl, thiolanyl, pyrrolidinyl, pyrrolidinium cationpyrrole, thiophe, pyrrolyl, furanyl, dioxanyl, dioxolanyl, dithiolanyl, maleinimidyl, maleinamidyl, oxazolinyl, oxazolidinyl, oxazolidnium cation, oxazolyl, isooxazolyl, imidazolyl, imidazolium cation, imidazolidinyl, imidazolidinium cation, pyrazolidinyl, pyrazolidinium cation, pyrazolyl, pyrazolium cation, pyrazolinyl, thiazolidinyl, thiazolidinium cation, thiazolyl, thiazolium cation, thiazolinyl, isothiazolyl, furazanyl, oxadiazolyl, dithiazolyl, tetrazolyl, piperidinyl, a piperidium cation, a piperazium oxane, pyranyl, thianyl, thiopyranyl, piperazinyl, diazinyl, morpholinyl, oxazinyl, thiomorpholinyl, thiazinyl, dioxinyl, dioxanyl, dithianyl, dithiinyl, triazinyl, tetrazinyl, azepanyl, azepinyl, such as oxepanyl, oxepinyl, thiepanyl, thiepinyl, homopiperazinyl, diazepinyl, thiazepinyl, azocanyl, azocinyl, oxecanyl, quinolinyl, quinolinium cation, benzothiphenyl, indolyl, benzofuranyl, acridinyl, dibenzothiophenyl, carbazolyl, dibenzofuranyl; ammonium cation, selected from an imidazolium cation, a pyrazolium cation.

Even more preferably the polar group is selected from the group consisting of:
- groups containing oxygen, preferably hydroxy, carbonyl, such as a ketone or aldehyde group, carbonate ester, carboxylate, carboxyl acid, carboxyl ester, ether, such as $C_1$-$C_6$alkoxy, acetal or ketal group, orthocarbonate ester,
- groups containing nitrogene, preferably carboxamide, primary amine, secondary amine, such as di-($C_1$-$C_{16}$alkyl)amino, tertiary amine, ammonium ion, primary ketimine, secondary ketimine, primary aldimine, secondary aldimine, aminocarbonyl, imide, azide, azo, cyanate, isocyanate, nitrate, nitrile, isonitrile, nitrosooxy, nitro, nitroso, pyridyl,
- unsubstituted or substituted straight-chain or branched alkynyl, which is preferably —≡—, —≡—$CH_3$, acetyl;
- unsubstituted or substituted carbocyclic or heterocyclic aromatic group or alicyclic group, incorporating preferably five, six, ten of 14 ring atoms, e.g. furan, benzyl or phenyl, pyridinyl, pyridinium cation, pyrimidinyl, pyrimidinium cation, naphthyl, which may form ring assemblies, such as biphenylyl or triphenyl, which are uninterrupted or interrupted by at least a single heteroatom and/or at least a single bridging group; or fused polycyclic systems, such as phenanthryl, tetralinyl. Preferably aromatic group are benzyl, phenyl, biphenyl or triphenyl. More preferred aromatic groups are benzyl, phenyl and biphenyl;

More preferred are ether, such as $C_1$-$C_6$ alkoxy, di-($C_1$-$C_{16}$ alkyl)amino, nitrile, pyridyl, unsubstituted or substituted straight-chain or branched alkynyl, which is preferably —≡—, —≡—$CH_3$, acetyl; unsubstituted or substituted carbocyclic or heterocyclic aromatic group or alicyclic group, incorporating preferably five, six, ten to 14 ring atoms, e.g. furan, benzyl or phenyl, pyridinyl, pyridinium cation, pyrimidinyl, pyrimidinium cation, naphthyl, which may form ring assemblies, such as biphenylyl or triphenyl, which are uninterrupted or interrupted by at least a single heteroatom and/or at least a single bridging group; or fused polycyclic systems, such as phenanthryl, tetralinyl. Preferably aromatic group are benzyl, phenyl, biphenyl or triphenyl. More preferred aromatic groups are benzyl, phenyl and biphenyl.

Most preferred is ether, such as $C_1$-$C_6$ alkoxy, di-($C_1$-$C_{16}$ alkyl)amino, nitrile, pyridyl, unsubstituted or substituted straight-chain or branched alkynyl, which is preferably —≡—, —≡—$CH_3$, acetyl; unsubstituted or substituted benzyl, phenyl or biphenyl; and especially preferred is nitrile, $C_1$-$C_6$ alkoxy.

In a preferred embodiment of the invention any substituent of the invention may represent a polar group.

A bridging group as used in the context of the present invention is preferably selected from —CH(OH)—, —CO—, —$CH_2$(CO)—, —SO—, —$CH_2$(SO)—, —$SO_2$—, —$CH_2$($SO_2$)—, —COO—, —OCO—, —$COCF_2$—, —$CF_2$CO—, —S—CO—, —CO—S—, —SOO—, —OSO—, —SOS—, —O—CO—O—, —$CH_2$—$CH_2$—, —$OCH_2$—, —$CH_2$O—, —CH=CH—, —C≡C—, —($C_1$-$C_6$alkyl)$_{1-6}$C=CH—COO—, —CH=CH—COO—, —OCO—CH=CH—, —OCO—CH=C($C_1$-$C_6$alkyl)$_{1-6}$CH—, —CH=N—, —C($CH_3$)=N—, —N=N—, heteroatom, cationic carbohydrogen group such as —(C+)-, or a single bond; or a cyclic, straight-chain or branched, substituted or unsubstituted $C_1$-$C_{24}$alkylen, wherein one or more —C—, —CH—, —$CH_2$— groups may independently from each other be unreplaced or replaced by a linking group as described above.

In the context of the present invention alkyl has the meaning of unsubstituted or substituted alkyl, wherein substituted alkyl has also the meaning alkylen. Alkyl, alkyloxy, alkoxy, alkylcarbonyloxy, acryloyloxyalkoxy, acryloyloxyalkyl, acryloyloxyalken, alkyloxycarbonyloxy, alkylacryloyloxy, methacryloyloxyalkoxy, methacryloyloxyalkyl, methacryloyloxyalken, alkylmethacryloyloxy, alkylmethacryloyloxy, alkylvinyl, alkylvinyloxy and alkylallyloxy and alkylene, as used in the context of the present invention denote with their alkyl residue, respectively their alkylene residue, a cyclic, straight-chain or branched, substituted or unsubstituted alkyl, respectively alkylene, in which one or more, preferably non-adjacent, —C—, —CH—, or —$CH_2$— group may be unreplaced or replaced by a linking group, preferably replaced by —O—, NH, —COO, OCO.

Further, in the context of the present invention "alkyl" is branched or straight chain, unsubstituted or substituted alkyl, preferably $C_1$-$C_{40}$ alkyl, especially $C_1$-$C_{30}$ alkyl, preferably $C_1$-$C_{20}$ alkyl, more preferably $C_1$-$C_{16}$ alkyl, most preferably $C_1$-$C_{10}$ alkyl and especially most preferably $C_1$-$C_6$ alkyl. Accordingly alkylen is for example $C_1$-$C_{40}$ alkylen, especially $C_1$-$C_{30}$ alkylen, preferably $C_1$-$C_{20}$ alkylen, more preferably $C_1$-$C_{16}$ alkylen, most preferably $C_1$-$C_{10}$ alkylen and especially most preferably $C_1$-$C_6$ alkylen. In the context of the present invention the definitions for alkyl given below, are applicable to alkylene in analogy.

$C_1$-$C_6$ alkyl is for example methyl, ethyl, propyl, isopropyl, butyl, sec.-butyl, tert.-butyl, pentyl or hexyl.

$C_1$-$C_0$ alkyl is for example methyl, ethyl, propyl, isopropyl, butyl, sec.-butyl, tert.-butyl, pentyl, hexyl, heptyl, octyl, nonyl, decyl.

$C_1$-$C_{16}$ alkyl is for example methyl, ethyl, propyl, isopropyl, butyl, sec.-butyl, tert.-butyl, pentyl, hexyl, heptyl, octyl, nonyl, decyl, undecyl, dodecyl, tridecyl, tetradecyl, pentadecyl or hexadecyl.

$C_1$-$C_{20}$ alkyl is for example methyl, ethyl, propyl, isopropyl, butyl, sec.-butyl, tert.-butyl, pentyl, hexyl, heptyl, octyl, nonyl, decyl, undecyl, dodecyl, tridecyl, tetradecyl, pentadecyl, hexadecyl, heptadecyl, octadecyl, nondecyl, eicosyl.

$C_1$-$C_{24}$ alkyl is for example methyl, ethyl, propyl, isopropyl, butyl, sec.-butyl, tert.-butyl, pentyl, hexyl, heptyl, octyl, nonyl, decyl, undecyl, dodecyl, tridecyl, tetradecyl, pentadecyl, hexadecyl, heptadecyl, octadecyl, nondecyl, eicosyl.

$C_1$-$C_{30}$ alkyl is for example methyl, ethyl, propyl, isopropyl, butyl, sec.-butyl, tert.-butyl, pentyl, hexyl, heptyl, octyl, nonyl, decyl, undecyl, dodecyl, tridecyl, tetradecyl, pentadecyl, hexadecyl, heptadecyl, octadecyl, nondecyl, eicosyl, heneicosyl, tricosyl, tetracosy, pentacosyl, hexacosdy, heptacosyl, octacosyl, nonacosy or triacontyl.

$C_1$-$C_{40}$ alkyl is for example methyl, ethyl, propyl, isopropyl, butyl, sec.-butyl, tert.-butyl, pentyl, hexyl, heptyl, octyl, nonyl, decyl, undecyl, dodecyl, tridecyl, tetradecyl, pentadecyl, hexadecyl, heptadecyl, octadecyl, nondecyl, eicosyl, heneicosyl, tricosyl, tetracosy, pentacosyl, hexacosdy, heptacosyl, octacosyl, nonacosy, triacontyl or tetracontyl.

$C_1$-$C_6$ alkoxy is for example methoxy, ethoxy, propoxy, isopropoxy, butoxy, sec.-butoxy, tert.-butoxy, pentoxy or hexoxy.

$C_1$-$C_{20}$ acryloyloxyalkylene, preferably $C_1$-$C_{10}$ acryloyloxyalkylene, $C_1$-$C_6$ acryloyloxyalkylene is for example acryloyloxymethylen, acryloyloxyethylene, acryloyloxypropylene, acryloyloxyisopropylene, acryloyloxybutylene, acryloyloxysec.-butylene, acryloyloxypentylene, acryloyloxyhexylene, acryloyloxyheptylene, acryloyloxyoctylene, acryloyloxynonylene, acryloyloxydecylene, acryloyloxyundecylene, acryloyloxydodecane, acryloyloxytridecylene, acryloyloxytetradecylene, acryloyloxypentyldecane, acryloyloxyhexadecylene, acryloyloxyheptadecylene, acryloyloxyoctadecylene, acryloyloxynondecylene, acryloyloxyeicosylene.

$C_1$-$C_{20}$ methacryloyloxyalkylene, preferably $C_1$-$C_{10}$ methacryloyloxyalkylene, $C_1$-$C_6$ methacryloyloxyalkylene is for example methacryloyloxymethylen, methacryloyloxyethylene, methacryloyloxypropylene, methacryloyloxyisopropylene, methacryloyloxybutylene, methacryloyloxysec.-butylene, methacryloyloxypentylene, methacryloyloxyhexylene, methacryloyloxyheptylene, methacryloyloxyoctylene, methacryloyloxynonylene, methacryloyloxydecylene, methacryloyloxyundecylene, methacryloyloxydodecane, methacryloyloxytridecylene, methacryloyloxytetradecylene, methacryloyloxypentyldecane, methacryloyloxyhexadecylene, methacryloyloxyheptadecylene, methacryloyloxyoctadecylene, methacryloyloxynondecylene, methacryloyloxyeicosylene.

$C_1$-$C_{20}$ acryloyloxyalkoxy, preferably $C_1$-$C_{10}$ acryloyloxyalkoxy, $C_1$-$C_6$ acryloyloxyalkoxy is for example acryloyloxymethoxy, acryloyloxyethoxy, acryloyloxypropoxy, acryloyloxyisopropoxy, acryloyloxybutoxy, acryloyloxy-sec.-butoxy, acryloyloxypentoxy, acryloyloxyhexoxy, acryloyloxyheptoxy, acryloyloxyoctoxy, acryloyloxynonoxy, acryloyloxydecoxy, acryloyloxyundecoxy, acryloyloxydodecanoxy, acryloyloxytridecyloxy.

$C_1$-$C_{20}$ methacryloyloxyalkoxy, preferably $C_1$-$C_{10}$ methacryloyloxyalkoxy, $C_1$-$C_6$ methacryloyloxyalkoxy is for example methacryloyloxymethoxy, methacryloyloxyethoxy, methacryloyloxypropoxy, methacryloyloxyisopropoxy, methacryloyloxybutoxy, methacryloyloxy-sec.-butoxy, methacryloyloxypentoxy, methacryloyloxyhexoxy, methacryloyloxyheptoxy, methacryloyloxyoctoxy, methacryloyloxynonoxy, methacryloyloxydecoxy, methacryloyloxyundecoxy, methacryloyloxydodecanoxy, methacryloyloxytridecyloxy.

An aliphatic group is for example a saturated or unsaturated, mono-, bi-, tri-, tetra-, penta-, hexa-, hepta-, octa-, nona-, deca-valent alkyl, alkylene, alkyloxy, alkylcarbonyloxy, acryloyloxy, alkylacryl, alkylmethacryl, alkyl(en)acryl(en), alkyl(en)methacryl(en), alkyloxycarbonyloxy, alkyloxycarbonyloxy methacryloyloxy, alkylvinyl, alkylvinyloxy or alkylallyloxy, which may comprise one or more heteroatom and/or bridging group.

An alicyclic group is preferably a non-aromatic group or unit and may be substituted or unsubstituted. Preferably an alicyclic group is a non-aromatic carbocyclic or heterocyclic group and represents for example ring systems, with 3 to 30 carbon atoms, as for example cyclopropane, cyclobutane, cyclopentane, cyclopentene, cyclohexane, cyclohexene, cyclohexadiene, decaline, tetrahydrofuran, dioxane, pyrrolidine, piperidine or a steroidal skeleton such as cholesterol. Preferred alicyclic group is cyclohexane. Substituents of an alicyclic group are halogene, preferably fluor or/and chloro, or $C_1$-$C_6$alkoxy which is substituted or unsubstituted with halogen, leading to the formation of an ether group, preferably methoxy or triflourmethyl or one or more hydroxyl groups. Preferred is a cyclohexanol group or a cyclohexan group substituted with a $C_1$-$C_6$alkoxy, which is then called in the context of the present invention a cycloxanether group.

The term "aromatic", as used in the context of the present invention, preferably denotes unsubstituted or substituted carbocyclic and heterocyclic groups, incorporating five, six, ten to 14 ring atoms, e.g. furan, benzene or phenylene, pyridine, pyrimidine, naphthalenen, which may form ring assemblies, such as biphenylene or triphenylen, which are uninterrupted or interrupted by at least a single heteroatom and/or at least a single bridging group; or fused polycyclic systems, such as phenanthrene, tetraline. Preferably aromatic group are benzene, phenylene, biphenylene or triphenylen. More preferred aromatic group is benzene, phenylene and biphenylene. Especially preferred substituents of an aromatic group or of a carbocyclic and heterocyclic groups are halogene, preferably fluor or/and chloro, $C_1$-$C_6$ alkoxy, preferably methoxy or triflourmethyl.

A carbocyclic or heterocyclic aromatic group or alicyclic group incorporates preferably three, four, five, six, ten or 14 ring atoms, as for example aziridin, epoxy, cyclopropyl, furan, pyrollidin, oxazolin, imidazol, benzene, pyridine, triazine, pyrimidine, naphthalene, phenanthrene, biphenylene or tetraline units, preferably naphthalene, phenanthrene, biphenylene or phenylene, more preferably naphthalene, biphenylene or phenylene, and most preferably phenylene.

Especially preferred substituents of carbocyclic and heterocyclic aromatic groups are halogene, preferably fluor or/and chloro, $C_1$-$C_6$ alkoxy, preferably methoxy or triflourmethyl.

The unsubstituted or substituted carbocyclic or heterocyclic aromatic or alicyclic group is for example unsubstituted or mono- or poly-substituted. Preferred substitutents of carbocyclic or heterocyclic aromatic groups are at least one triflourmethyl, halogen, such as fluor, chloro, bromo, iodo, especially fluor or/and cloro, and more especially fluor; hydroxyl, a polar group, acryloyloxy, alkylacryloyloxy, alkoxy, especially methoxy, ethoxy, propoxy; alkylcarbonyloxy, alkyloxycarbonyloxy, alkyloxocarbonyloxy, methacryloyloxy, vinyl, vinyloxy and/or allyloxy group, wherein the alkyl residue has preferably from 1 to 20 carbon atoms, and more preferably having from 1 to 10 carbon atoms. Preferred polar groups are nitro, nitrile or a carboxy group, and/or a cyclic, straight-chain or branched $C_1$-$C_{30}$ alkyl, which is unsubstituted, mono- or poly-substituted. Preferred substitutents of $C_1$-$C_{30}$ alkyl are methyl, fluorine and/or chlorine, wherein one or more, preferably non-adjacent, —C—, —CH—, —CH$_2$— group may independently of each other be replaced by a linking group. Preferably, the linking group is selected from —O—, —CO—, —COO— and/or —OCO—.

A monocyclic ring of five or six atoms is for example furan, benzene, preferably phenylene, pyridine, pyrimidine, pyridine cation, pyrimidine cation.

A bicyclic ring system of eight, nine or ten atoms is for example naphthalene, biphenylene or tetraline.

A tricyclic ring system of thirteen or fourteen atoms is for example phenanthrene. The term "phenylene", as used in the context of the present invention, preferably denotes a 1,2-, 1,3- or 1,4-phenylene group, which is optionally substituted. Especially preferred substituents of phenylene are halogene, preferably fluor or/and chloro, $C_1$-$C_6$ alkoxy, preferably methoxy or triflourmethyl. It is preferred that the phenylene group is either a 1,3- or a 1,4-phenylene group. 1,4-phenylene groups are especially preferred.

The term "halogen" denotes a chloro, fluoro, bromo or iodo substituent, preferably a chloro or fluoro substituent, and more preferably fluoro.

The term "heteroatom", as used in the context of the present invention is a neutral, anionic or cationic heteroatom and primarily denotes oxygen, sulphur and nitrogen, halogene, such as fluoro, chloro, bromo, iodo, and more preferably fluoro and/or chloro, and most preferably fluoro; preferably halogene, oxygen and nitrogen, in the latter case primary amine, secondary amine, tertiary amine or quartarnary ammonium cation, preferably in the form of —NH—.

The term "optionally substituted" as used in the context of the present invention primarily means substituted by lower alkyl, such as $C_1$-$C_6$ alkyl, lower alkoxy, such as $C_1$-$C_6$ alkoxy, hydroxy, halogen or by a polar group as defined above.

With respect to straight chain or branched alkyl, alkylene, alkoxy, alkylcarbonyloxy, acryloyloxyalkoxy, acryloyloxyalkyl, acryloyloxyalkene, alkyloxycarbonyloxy, alkylacryloyloxy, methacryloyloxyalkoxy, methacryloyloxyalkyl, methacryloyloxyalkene, alkylmethacryloyloxy, alkylmethacryloyloxy, alkylvinyl, alkylvinyloxy, alkylallyloxy and alkylene groups it is repeatedly pointed out that some or several of the —C—, —CH—, —CH$_2$— groups may be replaced e.g. by heteroatoms, but also by other groups, preferably bridging groups. In such cases it is generally preferred that such replacement groups are not directly linked to each other. It is alternatively preferred that heteroatoms, and in particular oxygen atoms are not directly linked to each other.

In a preferred embodiment, the first aspect of the invention relates to siloxane oligomer, polymer or copolymer for the photoalignment of liquid crystals, especially for the planar orientation of liquid crystals, and which derives from or comprises at least one monomer of formula (I):

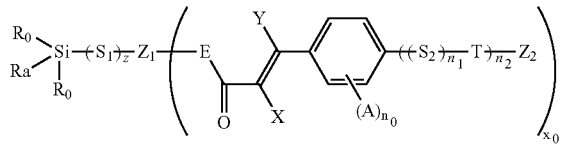

wherein $R_a$, z, $n_1$, $n_2$, x, $S_2$, A, $R_0$, T are as described above; and $Z_1$ represents a substituted or unsubstituted $C_5$-$C_6$ aliphatic or alicyclic group;

$S_1$ represents a substituted or unsubstituted $C_1$-$C_{24}$ straight chain alkyl;

E represents O, or S or NH;

X, Y are H; and $Z_2$ is $C_1$-$C_6$ alkoxy, di-($C_1$-$C_{16}$ alkyl)amino, nitrile, pyridyl, unsubstituted or substituted straight-chain or branched alkynyl, amine, acrylate, $C_1$-$C_6$ alkyl ester, unsubstituted or substituted carbocyclic or heterocyclic aromatic group or alicyclic group.

In another preferred embodiment, the first aspect of the invention relates to a siloxane oligomer, polymer or copolymer for the photoalignment of liquid crystals, especially for the planar orientation of liquid crystals, and which derives from or comprises at least one monomer (I):

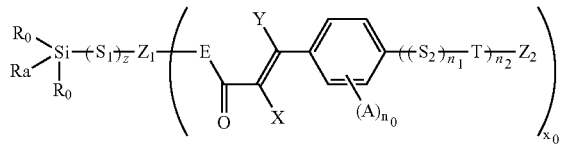

wherein $R_a$, z, $n_1$, $n_2$, x, $S_2$, $R_0$, T are as described above; and

A represents H, one or more halogens, one or more methoxy groups or one or more carboxylic groups;

$Z_1$ represents a substituted or unsubstituted $C_5$-$C_6$ alicyclic group;

$S_1$ represents a substituted or unsubstituted $C_1$-$C_{24}$ straight chain alkyl;

E represents O, or S or NH;

X, Y are H; and $Z_2$ is $C_1$-$C_6$ alkoxy, di-($C_1$-$C_{16}$ alkyl)amino, nitrile, pyridyl, unsubstituted or substituted straight-chain or branched alkynyl, amine, acrylate, $C_1$-$C_6$ alkyl ester, unsubstituted or substituted carbocyclic or heterocyclic aromatic group or alicyclic group.

In another preferred embodiment, the first aspect of the invention relates to a siloxane oligomer, polymer or copolymer for the photoalignment of liquid crystals, especially for the planar orientation of liquid crystals, and which derives from or comprises at least one monomer (I):

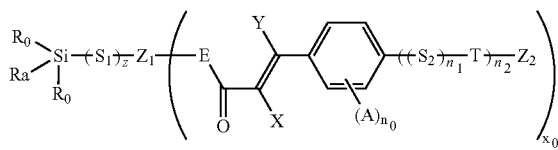

wherein $R_a$, z, $n_1$, $n_2$, x, $S_2$, $R_0$, T are as described above; and

A represents H, one or more halogens, one or more methoxy groups or one or more carboxylic groups;

$Z_1$ represents a substituted or unsubstituted $C_5$-$C_6$ alicyclic group;

$S_1$ represents a substituted or unsubstituted $C_1$-$C_{24}$ straight chain alkyl;

E represents O;

X, Y are H; and $Z_2$ is $C_1$-$C_6$ alkoxy, di-($C_1$-$C_{16}$ alkyl)amino, nitrile, pyridyl, unsubstituted or substituted straight-chain or branched alkynyl, amine, acrylate, $C_1$-$C_6$ alkyl ester, unsubstituted or substituted carbocyclic or heterocyclic aromatic group or alicyclic group.

In a further preferred embodiment the first aspect of the invention relates to a siloxane oligomer, polymer or copolymer for the photoalignment of liquid crystals, especially for the planar orientation of liquid crystals, and which derives from or comprises at least one monomer (I):

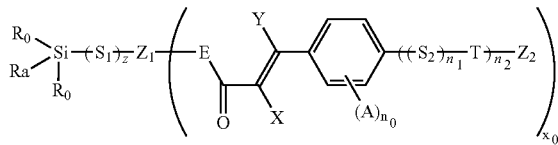

wherein:

$R_a$, z, $n_1$, $n_2$, x, $S_2$, $R_0$, $Z_2$, B are as described above; and

A represents H, one or more halogens, one or more methoxy groups or one or more carboxylic groups;

$Z_1$ is a substituted or unsubstituted cyclohexanol group or a substituted or unsubstituted cyclohexanether group;

$S_1$ is ethyl group;

E is O;

X, Y are H; and $Z_2$ is $C_1$-$C_6$ alkoxy, di-($C_1$-$C_{16}$ alkyl)amino, nitrile, pyridyl, unsubstituted or substituted straight-chain or branched alkynyl, amine, acrylate, $C_1$-$C_6$ alkyl ester, unsubstituted or substituted carbocyclic or heterocyclic aromatic group or alicyclic group.

In the context of the present invention, a copolymer is defined as a polymer comprising at least two different types of monomers, wherein the first monomer is a compound of formula (I) and the at least second monomer is different from the first one.

Furthermore, a copolymer is defined as a polymer having different polymer backbones which are also called backbone chains or main chains of a polymer. The polymer backbone is a series of covalently bound atoms that together create the continuous chain of a polymer.

Further, the side chain of the polymer is a chemical group that is attached to the polymer backbone. The side chain may contain the photoreactive group, or the non-photoreactive group or the group represented by the parentheses in formula (I).

Further a copolymer is defined as a polymer having the same backbone chains and different side chains.

Further a copolymer is defined as a polymer having different backbone chains and different side chains.

In one embodiment of the invention, the copolymer comprises a first monomer of formula (I) and a second monomer comprising a photoreactive group.

In a further embodiment of the invention, the copolymer comprises a first monomer having a first monomer of formula (I) and a second monomer having one non-photoreactive group.

The non-photoreactive group, can be a carbocyclic or heterocyclic aromatic and/or alicyclic or aliphatic group, which is unsubstituted or substituted by an acrylate group, vinyl group, allyl group, epoxy group, maleinimide group, straight-chain or branched $C_1$-$C_{16}$ alkyl group, $C_1$-$C_{16}$ alkylacrylate group, $C_1$-$C_{16}$ alkylvinyl group, $C_1$-$C_{16}$ alkylallyl group, $C_1$-$C_{16}$ alkylepoxy group, $C_1$-$C_{16}$ alkylmaleinimide group, preferably unsubstituted or substituted by $C_1$-$C_{16}$ alkylacrylate group, more preferably by $C_1$-$C_6$ alkylacrylate group.

Preferably the non-photoreactive group is an unsubstituted or substituted steroidal skeleton such as a cholesterol group, which is uninterrupted or interrupted by at least a single heteroatom and/or at least a single bridging group. Preferably, a cholesterol group is cholesteryl, cholestanyl, cholestan.

More preferred is a non-photoreactive group substituted or unsubstituted and selected from a carbocyclic or heterocyclic aromatic group, preferably a substituted or unsubstituted phenylen-(bridging group)-phenylene-, or -(phenylene)$_{n1}$-(bridging group)$_{m1}$-(phenylene)$_{n2}$-(bridging group)$_{m1}$-(cyclohexylen)$_{n3}$-, wherein bridging group has the same meaning and preferences as given below, and n1, n2, n3 represent an integer of 0, 1, 2,3, 3 or 4 and m1, m2 an integer of 0 or 1, with proviso that at least one n1, n2, n3 or n4 is >1; or the non-photoreactive group is naphthylene or phenylene, which are unsubstituted or substituted by at least one, preferably two, acrylate group, vinyl group, allyl group, epoxy group, maleinimide group, straight-chain or branched $C_1$-$C_{16}$ alkyl group, $C_1$-$C_{16}$ alkylacrylate group, $C_1$-$C_{16}$ alkylvinyl group, $C_1$-$C_{16}$ alkylallyl group, $C_1$-$C_{16}$ alkylepoxy group, $C_1$-$C_{16}$ alkyl-maleinimide group, preferably unsubstituted or substituted by $C_1$-$C_{16}$ alkylacrylate group, more preferably by $C_1$-$C_6$ alkylacrylate group; or selected from a carbocyclic or heterocyclic alicyclic group, preferably a steroidal skeleton, preferred steroidal skeleton is a cholesterol group, which is uninterrupted or interrupted by at least a single heteroatom and/or at least a single bridging group. More preferred steroid skeleton is a cholesterol group, preferred is cholesteryl, cholestanyl, cholestan.

Especially more preferred is a non-photoreactive group substituted or unsubstituted a carbocyclic or heterocyclic aromatic group, preferably selected from di-(phenyl)alkylen, such as -phenylene-ethylene-phenylene-; -phenylene-propylene-phenylene-, -phenylene-isopropylene-phenylene-, phenylene-butylene-phenylene-, -phenylene-pentylene-phenylene-naphthylene, phenylene, fluorene, benzoic acid, benzyl alcohol, benzoic acid, 2-methoxybenzoic acid, octafluoro-biphenyl, benzidine, fluorenone, 3,5, 3',5'-tetrabromo-biphenyl, 2,2'-dichloro-1,1'-biphenyl, 1,11-dimethyl-5,7-dihydro-dibenzo(a,c)cyclohepten-6-one, dibenzo(1,2)dithiine, benzo-phenone, diphenylmethane, 4,4-bis-(4-hydroxyphenyl)-valeric acid, 2,2-bis(4-hydroxyphenyl)-hexafluoropropane, 2,2-bis(4-methylphenyl)-hexafluoropropane, 2,2-bis(phenyl)hexa-fluoropropane, bis-(4-chloro-phenyl)-methanone, bis-(4-dimethyl -phenyl)-methanone, benzidine-3,3'-dicarboxylic acid, 1,1'-binaphthyl, diphenyl-3,3'-diglycolic acid, dihydroethidium, 2,2'-dichloro-5,5'-dimethoxybenzidine, 3-methoxybenzidine, 3,3'-dichlorobenzidine (diphenyl-d6), 2,2'-bis(trifluoromethyl)benzidine, 3,3'-bis(trifluoromethyl)-benzidine, 3,3'-dichloro-benzidine-d6, tetramethylbenzidine; or selected from a carbocyclic or heterocyclic alicyclic group, preferably a steroidal skeleton, preferred steroidal skeleton is a cholesterol group, which is uninterrupted or interrupted by at least a single heteroatom and/or at least a single bridging group. More preferred steroid skeleton is a cholesterol group, preferably is cholesteryl, cholestanyl, cholestan.

A siloxane oligomer, polymer or copolymer is a polymer, oligomer or copolymer comprising silicon atoms in the polymer backbone or main chain of the polymer.

In a second embodiment the invention relates to a composition comprising at least one said siloxane oligomer, polymer or copolymer as described above and a second polymer which is different from the first one.

In a preferred second embodiment the invention relates to a composition comprising at least one siloxane oligomer, polymer or copolymer as described above and a second polymer which is different from the first one and an additive.

The second polymer of the second embodiment of the present invention is a polymer selected from the group consisting of: polyamic acids, polyamic esters, polyimides, polymerizable liquid crystals, polymerized liquid crystals (LCP), polysiloxanes, polyacrylate, polymethacrylate, polyacrylamide, polymethacrylamide, polyvinylether, polyvinylester, polyallylether, polyallylester, polystyrene, polyamidimide, polymaleic acid, polyfumaric acid, polyurethane and derivatives thereof, polystyrol, polyester, polyurethane, polyethylene, polypropylen, polyvinylchloride, polytetrafluoroethylen, polycarbonate, polysilane, polymaleinimide, polynorbornene, polyterephthalate, polycyanostilbenes and dendrimere.

More preferred is polyamic acid or polyimide. Most preferred is polyamic acid.

The term "diamine" or "diamine compound" is to be understood as designating a chemical structure which has at least two amino groups, i.e. which may also have 3 or more amino groups.

If the second polymer is a diamine, the diamine represents an optionally substituted aliphatic, aromatic or alicyclic diamino group having from 1 to 40 carbon atoms and preferably made from or selected from the following group of structures: aniline, p-phenylenediamine, m-phenylenediamine, benzidine, diaminofluorene, or their derivatives, with the proviso that compounds listed which do not carry two amino groups are taken as derivatives with at least one additional amino group, and more preferably made from or selected from the following commercially available amino compounds (example of suppliers: Aldrich, ABCR, ACROS, Fluka) which can also be used as comonomers:

4-amino-2,3,5,6-tetrafluorobenzoic acid
4-amino-3,5-diiodobenzoic acid, 3,4-diaminobenzoic acid
4-amino-3-methylbenzoic acid,
4-amino-2-chlorobenzoic acid
4-aminosalicylic acid
4-aminobenzoic acid
4-aminophthalic acid
1-(4-aminophenyl)ethanol
4-aminobenzyl alcohol
4-amino-3-methoxybenzoic acid
4-aminophenyl ethyl carbinol
4-amino-3-nitrobenzoic acid
4-amino-3,5-dinitrobenzoic acid 4-amino-3,5-dichlorobenzoic acid
4-amino-3-hydroxybenzoic acid
4-aminobenzyl alcohol hydrochloride
4-aminobenzoic acid hydrochloride
pararosaniline base
4-amino-5-chloro-2-methoxybenzoic acid
4-(hexafluoro-2-hydroxyisopropyl)aniline
piperazine-p-amino benzoate
4-amino-3,5-dibromobenzoic acid
isonicotinic acid hydrazide p-aminosalicylate salt
4-amino-3,5-diiodosalicylic acid
4-amino-2-methoxybenzoic acid
2-[2-(4-aminophenyl)-2-hydroxy-1-(hydroxymethyl)ethyl]isoindoline-1,3-dione
4-amino-2-nitrobenzoic acid
2,4-diaminobenzoic acid
p-aminobenzoic acid,
[3,5-3h]-4-amino-2-methoxybenzoic acid
L-(+)-threo-2-amino-1-(4-aminophenyl)-1,3-propanediol
L-(+)-threo-2-(N,N-dimethylamino)-1-(4-aminophenyl)-1,3-propanediol
ethyl 2-(4-aminophenyl)-3,3,3-trifluoro-2-hydroxypropanoate
ethyl 2-(4-amino-3-methylphenyl)-3,3,3-trifluoro-2-hydroxypropanoate
ethyl 2-(4-amino-3-methoxyphenyl)-3,3,3-trifluoro-2-hydroxypropanoate
3,4-diaminobenzyl alcohol dihydrochloride
4-aminonaphthalene-1,8-dicarboxylic acid
4-amino-3-chloro-5-methylbenzoic acid
4-amino-2,6-dimethylbenzoic acid
4-amino-3-fluorobenzoic acid
4-amino-5-bromo-2-methoxybenzenecarboxylic acid
2,7-diaminofluorene
4,4'-diaminooctafluorobiphenyl
3,3'-diaminobenzidine
3,3',5,5'-tetramethylbenzidine
3,3'-dimethoxybenzidine
o-tolidine
3,3'-dinitrobenzidine
2-nitrobenzidine
3,3'-dihydroxybenzidine
o-tolidine sulfone
benzidine,
3,3'-dichlorobenzidine
2,2',5,5'-tetrachlorobenzidine,
benzidine-3,3'-dicarboxylic acid
4,4'-diamino-1,1'-binaphthyl
4,4'-diaminodiphenyl-3,3'-diglycolic acid
dihydroethidium
o-dianisidine
2,2'-dichloro-5,5'-dimethoxybenzidine
3-methoxybenzidine
3,3'-dichlorobenzidine (diphenyl-d6),
2,7-diamino-9-fluorenone
3,5,3',5'-tetrabromo-biphenyl-4,4'-diamine
2,2'-bis(trifluoromethyl)benzidine
2,2'-dichloro[1,1'-biphenyl]-4,4'-diamine
3,9-diamino-1,11-dimethyl-5,7-dihydro-dibenzo(a,c)cyclohepten-6-one
3,3'-bis(trifluoromethyl)benzidine
dibenzo(1,2)dithiine-3,8-diamine
3,3'-tolidine-5-sulfonic acid
3,3'-dichlorobenzidine-d6
tetramethylbenzidine
3,3'-diaminobenzophenone, 3,3'-diaminodiphenylmethane,
4,4-bis-(3-amino-4-hydroxyphenyl)-valeric acid
2,2-bis(3-amino-4-hydroxyphenyl)hexafluoropropane
2,2-bis(3-amino-4-methylphenyl)hexafluoropropane
tetrabromo methylenedianiline
2,7-diamino-9-fluorenone
2,2-bis(3-aminophenyl)hexafluoropropane
bis-(3-amino-4-chloro-phenyl)-methanone
bis-(3-amino-4-dimethylamino-phenyl)-methanone
3-[3-amino-5-(trifluoromethyl)benzyl]-5-(trifluoromethyl)aniline
1,5-diaminonaphthalene or their derivatives, again with the proviso that compounds listed which do not carry two amino groups are taken as derivatives with at least one additional amino group.

Preferred examples of additional other diamines are:
ethylenediamine, 1,3-propylenediamine, 1,4-butylenediamine, 1,5-pentylenediamine, 1,6-hexylenediamine, 1,7-heptylenediamine, 1,8-octylenediamine, 1,9-nonylenediamine, 1,10-decylenediamine, 1,11-undecylenediamine, 1,12-dodecylenediamine, α,α'-diamino-m-xylene, α,α'-diamino-p-xylene, (5-amino-2,2,4-trimethylcyclopentyl)methylamine, 1,2-diaminocyclohexane, 4,4'-diaminodicyclohexylmethane, 1,3-bis(methylamino)cyclohexane, 4,9-dioxadodecane-1,12-diamine, 3,5-diaminobenzoic acid methyl ester, 3,5-diaminobenzoic acid hexyl ester, 3,5-diaminobenzoic acid dodecyl ester, 3,5-diaminobenzoic acid isopropyl ester, 4,4'-methylenedianiline, 4,4'-ethylenedianiline, 4,4'-diamino-3,3'-dimethyldiphenylmethane, 3,3',5,5'-tetramethylbenzidine, 4,4'-diaminodiphenyl sulfone, 4,4'-diaminodiphenyl ether, 1,5-diaminonaphthalene, 3,3'-dimethyl-4,4'-diaminobiphenyl, 3,4'-diaminodiphenyl ether, 3,3'-diaminobenzophenone, 4,4'-diaminobenzophenone, 4,4'-diamino-2,2'-dimethylbibenzyl, bis[4-(4-aminophenoxy)phenyl] sulfone, 1,4-bis(4-aminophenoxy)benzene, 1,3-bis(4-aminophenoxy)benzene, 1,3-bis(3-aminophenoxy)benzene, 2,7-diaminofluorene, 9,9-bis(4-aminophenyl)fluorene, 4,4'-methylenebis(2-chloroaniline), 4,4'-bis(4-aminophenoxy)biphenyl, 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(1,4-phenyleneisopropylidene)bisaniline, 4,4'-(1,3-phenyleneisopropylidene)bisaniline, 2,2-bis[4-(4-aminophenoxy)phenyl]propane, 2,2-bis[3-(4-aminophenoxy)phenyl]hexafluoropropane, 2,2-bis[3-amino-4-methylphenyl]hexafluoropropane, 2,2-bis(4-aminophenyl)hexafluoropropane, 2,2'-bis[4-(4-amino-2-trifluoromethylphenoxy)phenyl]hexafluoropropane, 4,4'-diamino-2,2'-bis(trifluoromethyl)biphenyl, and 4,4'-bis[(4-amino-2-trifluoromethyl)phenoxy]-2,3,5,6,2',3',5',6'-octafluorobiphenyl;

as well as diamines disclosed in U.S. Pat. No. 6,340,506, WO 00/59966 and WO 01/53384, all of which are explicitly incorporated herein by reference;

The diamine compounds according to the present invention may be prepared using methods that are known to a person skilled in the art.

In addition, preferred diamines are the commercially available ones listed below:

Polymers
Poly(3,3',4,4'-benzophenonetetracarboxylic dianhydride-co-4,4'-oxydianiline/1,3-phenylenediamine), amic acid solution
Poly(3,3',4,4'-benzophenonetetracarboxylic dianhydride-co-4,4'-oxydianiline/1,3-phenylenediamine), amic acid solution
Poly(pyromellitic dianhydride-co-4,4'-oxydianiline), amic acid solution Aromatic Diamine
2,7-diaminofluorene
1,5-diaminoanthraquinone
2,6-diaminoanthraquinone
pararosaniline hydrochloride
3,6-acridinediamine
4,4'-diaminooctafluorobiphenyl
2,2'-dithiodianiline
3,3',5,5'-tetramethylbenzidine
3,3'-diaminodiphenyl sulfone
4,4'-diamino-2,2'-dimethylbibenzyl
4,4'-diaminodiphenyl ether
4,4'-dithiodianiline
4,4'-diaminodiphenyl sulfone
4,4'-diaminodiphenylmethane
4,4'-ethylenedianiline
3,3'-dimethoxybenzidine
2,2'-dithiobis(1-naphthylamine)
3,7-diamino-2-methoxyfluorene
3,6-diamino-10-methylacridinium chloride
propidium iodide
o-dianisidine dihydrochloride
2,7-diaminofluorene dihydrochloride
pararosaniline acetate
3,6-diamino-10-methylacridinium chloride hydrochloride
proflavine dihydrochloride
o-tolidine dihydrochloride
3,3',5,5'-tetramethylbenzidine dihydrochloride
3,3'-diaminobenzidine tetrahydrochloride
4,4'-diaminostilbene dihydrochloride
4,4'-diaminodiphenylamine sulfate
proflavine hemisulfate
2,2'-ethylenedianiline diphosphate
1,5-diamino-4,8-dihydroxyanthraquinone
o-tolidine
3,3'-diaminobenzophenone
3,3'-diaminodiphenylmethane
3,4'-diaminodiphenylmethane
2,2-bis[4-(4-aminophenoxy)phenyl]hexafluoropropane
4,4'-diamino-1,1'-dianthramide
3,3'-dinitrobenzidine
4,4'-diamino-5,5'-dimethyl-2,2'-biphenyldisulfonic acid
4,4'-diaminostilbene-2,2'-disulfonic acid
3-amino-4-hydroxyphenyl sulfone
4,4-bis-(3-amino-4-hydroxyphenyl)-valeric acid
2,2'-diamino-4,4'-difluorobibenzyl
2-amino-4-chlorophenyl disulfide
3,3'-(decamethylenedioxy)dianiline
3,3'-(pentamethylenedioxy)dianiline
4-(p-aminoanilino)-3-sulfoaniline
4-[3-(4-aminophenoxy)propoxy]aniline
2-nitrobenzidine
benzidine-3-sulfonic acid
4,4'-diaminodiphenyl sulfide
4,4'-diaminobenzanilide
n,n'-bis(3-aminophenylsulfonyl)ethylenediamine
2,2'-biphenyldiamine
3,4'-diaminodiphenyl ether
proflavine hemisulphate
phenosafranin
4,4'-diaminobenzophenone
2,2-bis(4-aminophenyl)hexafluoropropane
2,2-bis(3-amino-4-hydroxyphenyl)hexafluoropropane
2,2-bis(3-amino-4-methylphenyl)hexafluoropropane
3,3'-dihydroxybenzidine
3,3'-diamino-4,4'-dihydroxybiphenyl
4,4'-bis(4-aminophenoxy)biphenyl
2,2-bis[4-(4-aminophenoxy)phenyl]propane
1,4-bis(4-aminophenoxy)benzene
1,3-bis(4-aminophenoxy)benzene
bis[4-(4-aminophenoxy)phenyl]sulfone
9,9-bis(4-aminophenyl)fluorene
o-tolidine sulfone
benzidine
3,3'-dichlorobenzidine dihydrochloride
benzidine dihydrochloride
3,6-thioxanthenediamine-10,10-dioxide
4,4'-diamino-2,2'-biphenyldisulfonic acid
4,4'-azodianiline
2,5-bis-(4-aminophenyl)-(1,3,4)oxadiazole
3,3'-dimethylnaphthidine
benzidine sulfate
1,3-bis(3-aminophenoxy)benzene
3,3'-dichlorobenzidine
2,2',5,5'-tetrachlorobenzidine
4,4'-diamino-1,1'-binaphthyl
diamine bordeaux
benzoflavin
chrysaniline
2,2'-thiobis(5-aminobenzenesulfonic acid)
4,4'-methylene-bis(2-chloroaniline)
tetrabromo methylenedianiline
4,4'-diamino-3,3'-dinitrodiphenyl ether
benzidine pyrophosphate
3,6-diaminothioxanthene-10-dioxide, dihcl
4,4''-diamino-p-terphenyl
1,8-diamino-4,5-dihydroxyanthraquinone
bis(p-aminophenoxy)dimethylsilane
bis[4-(3-aminophenoxy)phenyl]sulfone
4,4'-methylenedi-2,6-xylidine
2-aminobenzaldehyde-ethylene-diimine
3-methylbenzidine dihydrochloride
3,3'-diethylbenzidine dihydrochloride
3,6-diaminoacridine hydrochloride
4,4'-diamino-5,5'-dimethyl-2,2'-biphenyl disulfonic acid disodium salt
4,4'-methylenebis(3-chloro-2,6-diethylaniline)
4,4'-methylene-bis-(2,6-diethylaniline)
4,4'-methylenebis-(2,6-diisopropylaniline)
toluylenediamine
3,8-diamino-6-phenylphenanthridine
thionin perchlorate
dihydroethidium
thionin
4,4-diamino benzene sulfonyl anilide
o-dianisidine hcl
2,2'-dichloro-5,5'-dimethoxybenzidine
3-methoxybenzidine
2,2'-(hexamethylenedioxy)dianiline
2,2'-(pentamethylenedioxy)dianiline
2,2'-(ethylenedioxy)dianiline
4-[4-(4-aminophenoxy)butoxy]aniline
2,2'-diamino-4'-methoxy-4-methylbenzanilide
5,5'-dimethyl-2,2'-dinitrobenzidine
n,n'-bis(2-aminophenyl)-1,3-propanediamine
3,4'-diaminochalcone
2,3',4,5',6-pentaphenyl-3,4'-biphenyldiamine
2-([1-(4-(1-[(2-aminophenyl)thio]-2-nitroethyl)phenyl)-2-nitroethyl]thio)anilin
2-((2-[(2-aminophenyl)thio]ethyl)thio)aniline
2-((4-[(2-aminophenyl)thio]but-2-enyl)thio)aniline
4,4'-diamino-3,3'-dimethyldiphenyl methane
2,2'-diamino-bibenzyl
trimethylene bis(4-aminobenzoate)

fluoresceinamine
benzidines mixture
3-nitro-4,4'-methylenedianiline
4,4-diamino-2,2'-dichlorodiphenyl disulfide
1,6-diaminopyrene
1,8-diaminopyrene
3,6-diaminocarbazole
4,4'(5')-diamino-[2,4]-dibenzo-18-crown-6,dihydrochloride
4,4'-diaminostilbene-2,2'-disulfonic acid, disodium salt
(r)-(+)-2,2'-diamino-1,1'-binaphthyl
proflavine hemisulfate dihydrate
3,6-diaminoacridine hemisulfate hemihydrate
dimidium bromide monohydrate
o-tolidine dihydrochloride hydrate
3,3',5,5'-tetramethylbenzidine dihydrochloride hydrate
3,3'-diaminobenzidine tetrahydrochloride dihydrate
3,6-[bis(4-amino-3-(sodiumsulphonato)phenlamino)]-2,5-dichloro 4-benzoquinone
2,2'-dimethylbenzidine hydrochloride
2,2'-(phenylmethylenebis)bis(4-methylaniline)
3,4'-diaminobiphenyl
2,7-diamino-9-fluorenone
n,n'-bis(2-aminophenyl)oxamide
2-[2-(2-aminophenyl)diaz-1-enyl]aniline
3,5,3',5'-tetrabromo-biphenyl-4,4'-diamine
n,n'-bis(4-aminophenyl)-1,3-bis(aminomethyl)benzene dihydrochloride
4',4''(5'')-diaminodibenzo-15-crown-5
2,2'-bis(trifluoromethyl)benzidine
bis(4-amino-2,3-dichlorophenyl)methane
alpha,alpha'-bis(4-aminophenyl)-1,4-diisopropylbenzene
2,2-bis(3-aminophenyl)hexafluoropropane
3,10-diamino-6,13-dichlorobenzo[5,6][1,4]oxazino[2,3-b]phenoxazine-4,11-disulfo
n1-(2-amino-4-methylphenyl)-2-aminobenzamide
n1-(2-amino-4-chlorophenyl)-2-aminobenzamide
2,2'-dichloro[1,1'-biphenyl]-4,4'-diamine
4,4'(5')-diaminodibenzo-15-crown-5 dihydrochloride
rcl s19,413-1
bis-(4-amino-3-nitro-phenyl)-methanone
bis-(3-amino-4-chloro-phenyl)-methanone
bis-(3-amino-4-dimethylamino-phenyl)-methanone
n,n'-bis-(4-amino-2-chloro-phenyl)-isophthalamide
n,n'-bis-(4-amino-2-chloro-phenyl)-terephthalamide
3,9-diamino-1,11-dimethyl-5,7-dihydro-dibenzo(a,c)cyclohepten-6-one
2-aminobenzaldehyde n-[(z)-(2-aminophenyl)methylidene]hydrazone
3,3'-bis(trifluoromethyl)benzidine
dicarboxidine 2 hcl
4,4'-(1,3-phenylenediisopropylidene)bisaniline
1,4-phenylenebis[[4-(4-aminophenoxy)phenyl]methanone]
2-((5-[(2-aminophenyl)thio]-3,4-dinitro-2-thienyl)thio)aniline
n1-(2-aminobenzoyl)-2-aminobenzene-1-carbohydrazide
2-[4-(5-amino-1 h-benzimidazol-2-yl)phenyl]-1 h-benzimidazol-5-amine
4-[4-(4-aminophenoxy)-2,3,5,6-tetrafluorophenoxy]aniline
3,3'-dinitro-4,4'-diaminodiphenyl sulfone
3,3',4,4'-tetraaminodiphenylsulfone
4-[1-(4-aminophenyl)-1-methylethyl]aniline
3,3-diamino diphenyl urea
bis(4-aminophenyl)acetylene
dibenzo(1,2)dithiine-3,8-diamine
ethidium homodimer-2
4.4'-bis-(2-aminobenzenesulfonyl)bis-phenolester
neopentyl glycol bis(4-aminophenyl) ether
2,2'-oxydianiline
4,4'-diaminodiphenylamine-2,2-disulphonic acid
4,4-diamino diphenyl urea
3,3'-tolidine-5-sulfonic acid
n1-(3-[(2-aminobenzoyl)amino]propyl)-2-aminobenzamide
2-((6-[(2-aminophenyl)sulfanyl]-5-nitro-2-pyridyl)sulfanyl)aniline
2-((6-amino-1,3-benzothiazol-2-yl)dithio)-1,3-benzothiazol-6-ylamine tetramethylbenzidine
2-([6-[(2-aminophenyl)sulfanyl]-3,5-di(trifluoromethyl)-2-pyridyl]sulfanyl) anil
3,6-diaminothioxanthene-10-dioxide dihydrochloride
m-tolidine dihydrochloride hydrate
2-amino-n-[2-amino-4-(trifluoromethyl)phenyl]-5-methylbenzamide
2-([2-[(2-aminophenyl)thio]-6-nitro-4-(trifluoromethyl)phenyl]thio)aniline
2-[(3-([(2-aminophenyl)thio]methyl)-2,4,6-trimethylbenzyl)thio]aniline
3-[3-amino-5-(trifluoromethyl)benzyl]-5-(trifluoromethyl)aniline
2-((5-[(2-aminophenyl)thio]-4-chloro-2-nitrophenyl)thio)aniline
4-(1-(4-aminophenyl)-2-[4-(dimethylamino)phenyl]vinyl)aniline
1,5-bis(4-aminophenoxy)pentane
2,3'-dichlorobenzidine dihydrochloride
3,3'-diamono-4,4'-dichlorodiphenyl sulfone
3-(bis-(4-amino-phenyl)-methyl)-2,3-dihydro-isoindol-1-one
4,4-diamino diphenyl-2-sulphonic acid
4,4'-diamino-diphenylene-cyclohexane
4,5'-diamino-(1,1')bianthracenyl-9,10,9',10'-tetraone
Alicyclic Diamines
4,4'-methylenebis(cyclohexylamine)
4,4'-methylenebis(2-methylcyclohexylamine)
Aliphatic Diamines
1,8-diamino-p-menthane
4,4'-methylenebis(cyclohexylamine)
d-cystine
l-cystine dimethyl ester dihydrochloride
neamine
bis(2-aminopropyl)amine
(h-cys-beta-na)2 2 hcl
l-cystine dibenzyl ester ditosylate
1.4-diaminocyclohexane
(h-cys-pna)2
dl-2-aminopropionic anhydride
l-cystine(di-b-naphthylamide)hydrochloride
l-cystine-bis-p-nitroanilide dihydrobromide
l-cystine diethyl ester dihydrochloride
trans-1,4-cyclohexanediamine
4,4'-methylenebis(2-methylcyclohexylamine)
l-leucinethiol, oxidized dihydrochloride
1,3-diaminoadamantane dihydrochloride
l-leucinethiol disulfide 2 hcl
l-cystine disodium salt, monohydrate
l-homocystine methylester hydrochloride
1,3-adamantanediamine
tetracyclo[8.2.1.1(8,11).0(2,7)]tetradeca-2,4,6-triene-10,11-diamine
tricyclo[3.3.1.0(3,7)]nonane-3,7-diamine
From the class of commercially available diamines preferred are the below listed ones:

Alicyclic Diamines
4,4'-methylenebis(cyclohexylamine)
4,4'-methylenebis(2-methylcyclohexylamine)
Aliphatic Diamines
4,4'-methylenebis(cyclohexylamine)
1.4-diaminocyclohexane
trans-1,4-cyclohexanediamine
4,4'-methylenebis(2-methylcyclohexylamine)
1,3-adamantanediamine
Aromatic Diamines
2,7-diaminofluorene
2,6-diaminoanthraquinone
4,4'-diaminooctafluorobiphenyl
4,4'-diaminodiphenyl ether
4,4'-dithiodianiline
4,4'-diaminodiphenylmethane
4,4'-ethylenedianiline
3,3'-dimethoxybenzidine
o-tolidine
3,3'-diaminobenzophenone
3,3'-diaminodiphenylmethane
3,4'-diaminodiphenylmethane
2,2-bis[4-(4-aminophenoxy)phenyl]hexafluoropropane
4-[3-(4-aminophenoxy)propoxy]aniline
4,4'-diaminodiphenyl sulfide
4,4'-diaminobenzophenone
2,2-bis(4-aminophenyl)hexafluoropropane
4,4'-bis(4-aminophenoxy)biphenyl
2,2-bis[4-(4-aminophenoxy)phenyl]propane
1,4-bis(4-aminophenoxy)benzene
1,3-bis(4-aminophenoxy)benzene
bis[4-(4-aminophenoxy)phenyl]sulf one
9,9-bis(4-aminophenyl)fluorene
benzidine
4,4'-azodianiline
1,3-bis(3-aminophenoxy)benzene
4,4'-diamino-1,1'-binaphthyl
4,4'''-diamino-p-terphenyl
bis(p-aminophenoxy)dimethylsilane
4-[4-(4-aminophenoxy)butoxy]aniline
3,4'-diaminochalcone
trimethylene bis(4-aminobenzoate)
3,4'-diaminobiphenyl
2,7-diamino-9-fluorenone
4',4'''(5''')-diaminodibenzo-15-crown-5
2,2'-bis(trifluoromethyl)benzidine
alpha,alpha'-bis(4-aminophenyl)-1,4-diisopropylbenzene
3,3'-bis(trifluoromethyl)benzidine
4,4'-(1,3-phenylenediisopropylidene)bisaniline
1,4-phenylenebis[[4-(4-aminophenoxy)phenyl]methanone]
4-[4-(4-aminophenoxy)-2,3,5,6-tetrafluorophenoxy]aniline
4-[1-(4-aminophenyl)-1-methylethyl]aniline
neopentyl glycol bis(4-aminophenyl) ether
4,4-diamino diphenyl or
1,5-bis(4-aminophenoxy)pentane From the class of commercially available diamines (L) more preferred are the below listed ones:
Aromatic Diamines
2,7-diaminofluorene
4,4'-diaminooctafluorobiphenyl
4,4'-diaminodiphenyl ether
4,4'-diaminodiphenylmethane
4,4'-ethylenedianiline
3,3'-diaminobenzophenone
4-[3-(4-aminophenoxy)propoxy]aniline
4,4'-diaminodiphenyl sulfide
4,4'-diaminobenzophenone
2,2-bis(4-aminophenyl)hexafluoropropane
4,4'-bis(4-aminophenoxy)biphenyl
2,2-bis[4-(4-aminophenoxy)phenyl]propane
1,4-bis(4-aminophenoxy)benzene
1,3-bis(4-aminophenoxy)benzene
9,9-bis(4-aminophenyl)fluorene
benzidine
bis(p-aminophenoxy)dimethylsilane
4-[4-(4-aminophenoxy)butoxy]aniline
3,4'-diaminochalcone
trimethylene bis(4-aminobenzoate)
3,4'-diaminobiphenyl
2,7-diamino-9-fluorenone
4',4''(5'')-diaminodibenzo-15-crown-5
4-[4-(4-aminophenoxy)-2,3,5,6-tetrafluorophenoxy]aniline
4-[1-(4-aminophenyl)-1-methylethyl]aniline
1,5-bis(4-aminophenoxy)pentane
Aliphatic Diamines
4,4'-methylenebis(cyclohexylamine)
1.4-diaminocyclohexane
Alicyclic diamines
4,4'-methylenebis(cyclohexylamine)

Preferably, the further polymer, homo- or copolymer or oligomer comprises at least a diamine as one of the basic building block, and a tetracarboxylic acid anhydride, preferably a tetracarboxylic acid anhydride of formula (II).

Preferably, the substituted or unsubstituted, preferably substituted within polar group or unsubstituted, tetracarboxylic acid anhydride is of formula (II)

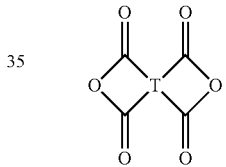

(II)

wherein:
T represents a tetravalent organic radical.

The tetravalent organic radical T is preferably derived from an aliphatic, alicyclic or aromatic tetracarboxylic acid dianhydride.

The tetravalent organic radical T is preferably derived from an aliphatic, alicyclic or aromatic tetracarboxylic acid dianhydride.

Preferred examples of aliphatic or alicyclic tetracarboxylic acid dianhydrides are: 1,1,4,4-butanetetracarboxylic acid dianhydride, ethylenemaleic acid dianhydride, 1,2,3,4-cyclobutanetetracarboxylic acid dianhydride, 1,2,3,4-cyclopentanetetracarboxyli c acid dianhydride; 2,3,5-tricarboxy-cyclopentylacetic acid dianhydride (with the term "2,3,5-tricarboxycyclopentylacetic acid dianhydride" all isomers of this compound are incorporated especially the exo and/or endo body), 2,3,5-tricarboxycyclopentylacetic-1,2:3,4-dianhydride is accessible for example by processes as described in JP59-190945, JP60-13740 and JP58-109479, respectively DE 1078120 and JP58-109479, or GB 872,355, and JP4458299, which processes are herewith incorporated by reference;
tetrahydro-4,8-methanofuro[3,4-d]oxepine-1,3,5,7-tetrone, 3-(carboxymethyl)-1,2,4-cyclopentanetricarboxylic acid 1,4:2,3-dianhydride,
hexahydrofuro[3',4':4,5]cyclopenta[1,2-c]pyran-1,3,4,6-tetrone, 3,5,6-tricarboxy-norbornylacetic acid dianhydride, 2,3,4,5-tetrahydrofurantetracarboxylic acid dianhydride,rel-[1S,5R,6R]-3-oxabicyclo[3.2.1]octane-2,4-dione-6-spiro-3'-(tetrahydrofuran2',5'-dione),
4-(2,5-dioxotetrahydrofuran-3-yl)tetrahydronaphthalene-1,2-dicarboxy-licacid dianhydride, 5-(2,5-dioxotetrahydrofuran-3-yl)-3-methyl-3-cyclohexene-1,2-dicarboxylic-acid dianhydride, bicyclo[2.2.2]oct-7-ene-2,3,5,6-tetracarboxylic acid dianhydride,
bicyclo[2.2.2]octane-2,3,5,6-tetracarboxylic acid dianhydride,
1,8-dimethylbicyclo[2.2.2]oct-7-ene-2,3,5,6-tetracarboxylic acid dianhydride,
pyromellitic acid dianhydride,3,3',4,4'-benzophenonetetracarboxylic acid dianhydride,
4,4'-oxydiphthalic acid dianhydride,
3,3',4,4'-diphenylsulfonetetracarboxylic acid dianhydride,
1,3-dimethyl-1,2,3,4-cyclobutanetetracarboxylicacid dianhydride,
1,3-difluoro-1,2,3,4-cyclobutanetetracarboxylicacid dianhydride,
1,3-dichloro-1,2,3,4-cyclobutanetetracarboxylicacid dianhydride,
1,2,3-trimethyl-1,2,3,4-cyclobutanetetracarboxylicacid dianhydride,
1,2,3,4-tetramethyl-1,2,3,4-cyclobutanetetracarboxylicacid dianhydride,
1-methyl-1,2,3,4-cyclobutanetetracarboxylicacid dianhydride,
1,4,5,8-naphthalenetetracarboxylic acid dianhydride,2,3,6,7-naphthalenetetracarboxylic acid dianhydride, 3,3',4,4'-dimethyldiphenylsilanetetracarboxylic acid dianhydride,
3,3',4,4'-tetraphenylsilanetetracarboxylic acid dianhydride, 1,2,3,4-furantetracarboxylic acid di-anhydride, 4,4'-bis(3,4-dicarboxyphenoxy)diphenyl sulfide dianhydride,
4,4'-bis(3,4-dicarboxyphenoxy)-diphenyl sulfone dianhydride,
4,4'-bis(3,4-dicarboxyphenoxy)diphenylpropane dianhydride,
3,3',4,4'-biphenyltetracarboxylic acid dianhydride,
ethylene glycol bis(trimellitic acid) dianhydride,4,4'-(1,4-phenylene)bis(phthalic acid) dianhydride, 4,4'-(1,3-phenylene)bis(phthalic acid) dianhydride,
4,4'-(hexafluoroisopropylidene)diphthalic acid dianhydride,
4-tert-butyl-6-(2,5-dioxotetrahydro-3-furanyl)-2-benzofuran-1,3-dione,
5-(2,5-dioxotetrahydro-3-furanyl)-3a,4,5,9b-tetrahydronaphtho[1,2-c]furan-1,3-dione,
5-(2,5-dioxotetrahydro-3-furanyl)-5-methyl-3a,4,5,9b-tetrahydronaphtho[1,2-c]furan-1,3-dione,
5-(2,5-dioxotetrahydro-3-furanyl)-6-methylhexahydro-2-benzofuran-1,3-dione,
5-(2,5-dioxotetrahydro-3-furanyl)-7-methyl-3a,4,5,7a-tetrahydro-2-benzofuran-1,3-dione,
6-(2,5-dioxotetrahydro-3-furanyl)-4-methylhexahydro-2-benzofuran-1,3-dione,
9-isopropyloctahydro-4,8-ethenofuro[3',4':3,4]cyclobuta[1,2-f][2]benzofuran-1,3,5,7-tetrone,
1,2,5,6-cyclooctanetetracarboxylic acid dianhydride,
octahydro-4,8-ethenofuro[3',4':3,4]cyclobuta[1,2-f][2]benzofuran-1,3,5,7-tetrone,
octahydrofuro[3',4':3,4]cyclobuta[1,2-t][2]benzofuran-1,3,5,7-tetrone,
tetrahydro-3,3'-bifuran-2,2',5,5'-tetrone,
4,4'-oxydi(1,4-phenylene)bis(phthalic acid) dianhydride, and
4,4'-methylenedi(1,4-phenylene)bis(phthalic acid) dianhydride.

Preferred examples of aromatic tetracarboxylic acid dianhydrides are: pyromellitic acid dianhydride,
3,3',4,4'-benzophenonetetracarboxylic acid dianhydride,
4,4'-oxydiphthalic acid dianhydride,
3,3',4,4'-diphenylsulfonetetracarboxylic acid dianhydride,
1,4,5,8-naphthalenetetracarboxylic acid dianhydride,
2,3,6,7-naphthalenetetracarboxylic acid dianhydride,
3,3',4,4'-dimethyldiphenylsilanetetracarboxylic acid dianhydride,
3,3',4,4'-tetraphenylsilanetetracarboxylic acid dianhydride,
1,2,3,4-furantetracarboxylic acid dianhydride,
4,4'-bis(3,4-dicarboxyphenoxy)diphenyl sulfide dianhydride,
4,4'-bis(3,4-dicarboxyphenoxy)diphenyl sulfone dianhydride,
4,4'-bis(3,4-dicarboxyphenoxy)diphenylpropane dianhydride,
3,3',4,4'-biphenyltetracarboxylic acid dianhydride,
ethylene glycol bis(trimellitic acid) dianhydride,
4,4'-(1,4-phenylene)bis(phthalic acid) dianhydride,
4,4'-(1,3-phenylene)bis(phthalic acid) dianhydride,
4,4'-(hexafluoroisopropylidene)diphthalic acid dianhydride,
4,4'-oxydi(1,4-phenylene)bis(phthalic acid) dianhydride,
4,4'-methylenedi(1,4-phenylene)bis(phthalic acid) dianhydride,
4-tert-butyl-6-(2,5-dioxotetrahydro-3-furanyl)-2-benzofuran-1,3-dione,
and the like.

More preferably the tetracarboxylic acid dianhydrides used to form the tetravalent organic radical T are selected from:
1,2,3,4-cyclobutanetetracarboxylic acid dianhydride,
1,2,3,4-cyclopentanetetracarboxylic acid dianhydride,
2,3,5-tricarboxycyclopentylacetic acid dianhydride,
tetrahydro-4,8-methanofuro[3,4-d]oxepine-1,3,5,7-tetrone,
3-(carboxymethyl)-1,2,4-cyclopentanetricarboxylic acid 1,4:2,3-dianhydride,
hexahydrofuro[3',4':4,5]cyclopenta[1,2-c]pyran-1,3,4,6-tetrone,
5-(2,5-dioxotetrahydrofuran-3-yl)-3-methyl-3-cyclohexene-1,2-dicarboxylic acid dianhydride,
pyromellitic acid dianhydride,
4-(2,5-dioxotetrahydrofuran-3-yl)tetrahydronaphthalene-1,2-dicarboxylic acid dianhydride,
5-(2,5-dioxotetrahydro-3-furanyl)-5-methyl-3a,4,5,9b-tetrahydronaphtho[1,2-c]furan-1,3-dione,
5-(2,5-dioxotetrahydro-3-furanyl)-3a,4,5,9b-tetrahydronaphtho[1,2-c]furan-1,3-dione,
5-(2,5-dioxotetrahydro-3-furanyl)-7-methyl-3a,4,5,7a-tetrahydro-2-benzofuran-1,3-dione,
4-tert-butyl-6-(2,5-dioxotetrahydro-3-furanyl)-2-benzofuran-1,3-dione,
4,4'-(hexafluorneoisopropylidene)diphthalic acid dianhydride and
bicyclo[2.2.2]oct-7-ene-2,3,5,6-tetracarboxylic acid dianhydride.

In the context of the present invention the term "polyimide" has the meaning of partially or completely imidisated polyamic acid or polyamic ester. In analogy, the term "imidisation" has in the context of the present invention the meaning of partially or complete imidisation.

The second embodiment of the present invention relates more particularly to a composition wherein the second polymer is 100% imidised, or has an imidisation degree in the range of 1 to 99%, preferably 5 to 50%, more preferably 10 to 40% by weight.

More preferably the polymerizable liquid crystal or the polymerized liquid crystal contains a polar group.

In the context of the second embodiment of the present invention, the composition may comprise a siloxane oligomer, polymer or copolymer as described above, a second polymer which is different from the first one and at least one additional polymer which is different from the first and from the second polymer of the composition.

In the second preferred embodiment the invention relates to a composition comprising at least one siloxane oligomer, polymer or copolymer as described above and a second polymer which is different from the first one and an additive and wherein the additive is an additive which is known by the person skilled in the art.

The additive is selected from the group consisting of: nucleating agents, clarifying agents, antistatics, antioxidants, slip agents, silica, talc, stabilizers, UV stabilizers, lubricants, coupling agents, antimicrobial agents, crosslinking agents, agents enhancing the crosslinking of the polymer backbone, as for example an acid generator, a base generator or a tetra-alkoxy-siloxane as tetraethoxysilan, surfactants, photo-active agents, photo-sensitizers, photo generators, in particular cationic photo-generators.

Additives such as silane-containing compounds and epoxy-containing crosslinking agents may be added.

Suitable silane-containing additives are described in Plast. Eng. 36 (1996), (Polyimides, fundamentals and applications), Marcel Dekker, Inc.

Suitable epoxy-containing cross-linking additives include 4,4'-methylene-bis-(N,N-diglycidylaniline), trimethylolpropane triglycidyl ether, benzene-1,2,4,5-tetracarboxylic acid 1,2,4,5-N,N'-diglycidyldiimide, polyethylene glycol diglycidyl ether, N,N-diglycidylcyclohexylamine and the like.

Suitable photo-active agents include 2,2-dimethoxyphenylethanone, a mixture of diphenylmethanone and N,N-dimethylbenzenamine or ethyl 4-(dimethylamino)-benzoate, xanthone, thioxanthone, 1-Hydroxy-cyclohexyl-phenyl-ketone, 2-Benzyl-2-dimethylamino-1-(4-morpholinophenyl)-butanone-1, Irgacure®500 (1:1 mixture by weight of 1-Hydroxy-cyclohexyl-phenyl-ketone and benzophenone) and 2,2-Dimethoxy-1,2-diphenylethan-1-one, Michler's ketone, triaryl sulfonium salt and the like.

The compositions, preferably blends comprising a polymer, copolymer or oligomer according to definition and preferences of the invention, optionally further comprise an organic solvent. Example of organic solvents are chlorobenzene, pyrrolidone solvents, preferably, N-methyl-2-pyrrolidone, N-ethyl-2-pyrrolidone, N-cyclohexyl-2-pyrrolidone; imidazolidinone, dimethylsulfoxide, dimethylformamide, toluene, chloroform, organic ester, such as acetyl acetic ester or butyl acetic ester, pentyl acetic ester, hexyl acetic ester; further Y-butyrolactone, methyl cellosolve, butyl cellosolve, butyl carbitol, tetrahydrofuran, ditehylene glycol diethylether, dipentylether dipropylene glycol dimethylether, diisobutyl ketone momoethylene glycol dimethyl ether, etc. These solvents can be used alone or in mixtures thereof.

In a third embodiment the present invention relates to a process for the preparation of the siloxane oligomer, polymer or copolymer comprising the steps of:
i. reacting at least one compound selected from the group consisting of siloxane monomers, polymers and oligomers comprising the monomer of formula (II)

wherein
$R_0$ represents OH, substituted or unsubstituted alkoxyl group having 1 to 20 carbons, alkyl group having 1 to 20 carbons, or aryl group having 1 to 20 carbons;
$R_a$ represents OH, Cl, a linear or branched, substituted or unsubstituted alkoxyl group having 1 to 20 carbons, in which a C, CH could be replaced by unsubstituted or substituted $C_6$-$C_{20}$ aryl group;
$S_1$ represent a single bond or a straight-chain or branched, substituted or unsubstituted $C_1$-$C_{24}$ alkylen, especially $C_1$-$C_{12}$ alkylen, more especially $C_1$-$C_8$ alkylen, more especially $C_1$-$C_6$ alkylen, most especially $C_1$-$C_4$ alkylen, most especially $C_1$-$C_2$ alkylen in which one or more —C—. —CH—, $CH_2$— groups may be replaced by a heteroatom;
z is an integer from 0 to 15, preferably from 1 to 10, more preferably from 1 to 5, even more preferably from 1 to 3, most preferred n is 1;
$Z_3$ represents a single bond or substituted or unsubstituted aliphatic or alicyclic group of $C_3$ to $C_{08}$ having an epoxy group, most preferably Z3 represents an alicyclic $C_5$ to $C_6$ group having an epoxy group;
with at least another compound of formula (III)

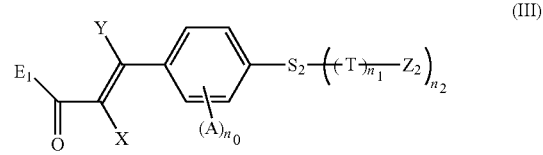

wherein
$E_1$ represents an OH, SH, $NH_2$, $NH(C_1$-$C_6$alkyl), $NHR^4$, HOC, HOOC, HOCONH, $HOCONR^4$, HSCS, HSC, wherein $R^4$ is cyclic, straight chain or branched, substituted or unsubstitued $C_1$-$C_{24}$ alkyl where in one or more —C—, —CH—, —$CH_2$-group (s) may be independently from each other replaced by a linking group.
X, Y each independently from each other represents H, F, Cl, CN;
A represents halogen, H or substituted or unsubstituted $C_1$-$C_{24}$ alkyl, a substituted or unsubstituted $C_1$-$C_{24}$ alkenyl, a substituted or unsubstituted $C_1$-$C_{24}$ alkyl, or a carboxylic acid, wherein one or more, —C—, —CH—, —$CH_2$—, group may independently from each other be replaced by a heteroatom; preferably A is halogen, or a $C_1$-$C_{24}$ alkoxy; most preferably A is H, F, methoxy or a carboxylic acid;
$S_2$ represents a cyclic, aromatic, straight-chain or branched, substituted or unsubstituted $C_1$-$C_{24}$ alkylen, especially $C_1$-$C_{12}$ alkylen, more especially $C_1$-$C_8$ alkylen, more especially $C_1$-$C_6$ alkylen, most especially $C_1$-$C_4$ alkylen, most especially $C_1$-$C_2$ alkylen in which one or more —C—, —CH—, —$CH_2$— groups may be replaced by a linking group;

$n_1$ is an integer from 1 to 15, preferably from 1 to 10, most preferably from 1 to 3, most preferred n is 1;

$n_2$ is an integer from 0 to 15, preferably from 1 to 10, most preferably from 1 to 3, most preferred n is 1;

$Z_2$ represents a chemical group having a delocalisation of its electronical density and/or inducing a delocalisation of the electronical density of its neighboring atom;

and T represents an unsubstituted or substituted, straight-chain $C_1$-$C_{16}$ alkyl, in the presence of an organic solvent, water and a catalyst;

ii. optionally reacting the product obtained by step i) with a $C_1$-$C_{24}$ linear, branched or cyclic alcohol wherein one or more —C—, —CH—, —CH$_2$— group(s) may be independently from each other be replaced by a linking group, under the presence of a catalyst; and iii. isolating and purifying the obtained product.

In the context of the present invention, organic solvent means any solvent commonly known in the art. More specifically the organic solvent is selected from the group consisting of: hydrocarbon, ketone, ester, ether and alcohol.

Examples of the above hydrocarbon include toluene and xylene; examples of the above ketone include methyl ethyl ketone, methyl isobutyl ketone, methyl n-amyl ketone, diethyl ketone and cyclohexanone; examples of the above ester include ethyl acetate, n-butyl acetate, i-amyl acetate, propylene glycol monomethyl ether acetate, 3-methoxybutyl acetate and ethyl lactate; examples of the above ether include ethylene glycol dimethyl ether, ethylene glycol diethyl ether, tetrahydrofuran and dioxane; and examples of the above alcohol include 1-hexanol, 4-methyl-2-pentanol, ethylene glycol monomethyl ether, ethylene glycol monoethyl ether, ethylene glycol mono-n-propyl ether, ethylene glycol mono-n-butyl ether, propylene glycol monomethyl ether, propylene glycol monoethyl ether and propylene glycol mono-n-propyl ether. Out of these, water-insoluble organic solvents are preferred.

The amount of the organic solvent is preferably 0.5 to 10,000 parts by weight, more preferably 50 to 1,000 parts by weight based on 100 parts by weight of the total of all the silane compounds.

These organic solvents may be used alone or in combination of two or more.

The amount of water used to produce the siloxane is preferably 0.01 to 100 times, more preferably 0.1 to 30 times the total molar amount of all the silane compounds.

In the context of the present invention, the catalyst is any catalyst known in the art. The catalyst is selected from the group consisting of: acid, alkali metal compound, organic base, curing accelerator, titanium compound or zirconium compound. Preferred are organic base catalysts or curing accelerators. Examples of organic base catalysts include but are not limited to primary and secondary organic amines, such as ethylamine, diethylamine, piperazine, iperidine, pyrrolidine and pyrrole; tertiary organic amines such as trimethylamine, tri-n-propylamine, tri-n-butylamine, pyridine, 4-dimethtylaminopyridine and diazabicycloundecene; and quaternary organic amines such as tetramethylammonium hydroxide, U-CAT compounds from SAN-APRO Ltd as for example, U-CAT SA 506, U-CAT 18X, U-CAT. Examples of curing accelerator include but are not limited to tertiary amines such as benzyldimethylamine, 2,4,6-tris(dimethylaminomethyl)phenol, cyclohexyldimethylamine and triethanolamine; imidazole compounds such as 2-methylimidazole, 2-n-heptylimidazole, 2-n-undecylimidazole, 2-phenylimidazole, 2-phenyl-4-methylimidazole, 1-benzyl-2-methylimidazole, 1-benzyl-2-phenylimidazole, 1,2-dimethylimidazole, 2-ethyl-4-methylimidazole 1-(2-cyanoethyl)-2-methylimidazole, 1-(2-cyanoethyl)-2-n-undecylimidazole, 1-(2-cyanoethyl)-2-phenylimidazole, 1-(2-cyanoethyl)-2-ethyl-4-methylimidazole, 2-phenyl-4-methyl-5-hydroxymethylimidazole, 2-phenyl-4,5-di(hydroxymethyl)imidazole, 1-(2-cyanoethyl)-2-phenyl-4,5-di[(2'-cyanoethoxy)methyl]imidazole, 1-(2-cyanoethyl)-2-n-undecylimidazolium trimellitate, 1-(2-cyanoethyl)-2-phenylimidazolium trimellitate, 1-(2-cyanoethyl)-2-ethyl-4-methylimidazolium trimellitate, 2,4-diamino-6-[2'-methylimidazolyl-(1')]ethyl-s-triazine, 2,4-diamino-6-(2'-n-undecylimidazolyl)ethyl-s-triazine, 2,4-diamino-6-[2'-ethyl-4'-methylimidazolyl-(1')]ethyl-s-triazine, isocyanuric acid adduct of 2-methylimidazole, isocyanuric acid adduct of 2-phenylimidazole and isocyanuric acid adduct of 2,4-diamino-6-[2'-methylimidazolyl-(1')]ethyl-s-triazine; organic phosphorus compounds such as diphenyl phosphine, triphenyl phosphine and triphenyl phosphite; quaternary phosphonium salts such as benzyltriphenylphosphonium chloride, tetra-n-butylphosphonium bromide, methyltriphenylphosphonium bromide, ethyltriphenylphosphonium bromide, n-butyltriphenylphosphonium bromide, tetraphenylphosphonium bromide, ethyltriphenylphosphonium iodide, ethyltriphenylphosphonium acetate, tetra-n-butylphosphonium o,o-diethylphosphorodithionate, tetra-n-butylphosphonium benzotriazolate, tetra-n-butylphosphonium tetrafluoroborate, tetra-n-butylphosphonium tetraphenylborate and tetraphenylphosphonium tetraphenylborate; diazabicycloalkenes such as 1,8-diazabicyclo[5.4.0]undecene-7 and organic acid salts thereof; organic metal compounds such as zinc octylate, tin octylate and aluminum acetylacetone complex; quaternary ammonium salts such as tetraethylammonium bromide, tetra-n-butylammonium bromide, tetraethylammonium chloride and tetra-n-butylammonium chloride; boron compounds such as boron trifluoride and triphenyl borate; metal halogen compounds such as zinc chloride and stannic chloride; and latent curing accelerators including high-melting point dispersible latent curing accelerators such as amine adduct type accelerators including dicyandiamide and an adduct of an amine with epoxy resin; microcapsule type latent curing accelerators obtained by coating the surfaces of curing accelerators such as the above imidazole compounds, organic phosphorus compounds and quaternary phosphonium salts with a polymer; amine salt type latent curing accelerators; and high-temperature dissociation type thermally cationic polymerization latent curing accelerators such as Lewis acid salts and Brcpmsted acid salts.

The catalyst is used in an amount of preferably not more than 100 parts by weight, more preferably 0.01 to 100 parts by weight, much more preferably 0.05 to 20 parts by weight based on 100 parts by weight of the compound of formula (II).

The reaction temperature is preferably 0 to 200° C., more preferably 50°, 60°, 70°, 80° or 90° to 150°, 140°, 130°, 120°, 110° or 100°.

The reaction time is 0.1 to 72 hours, more preferably 0.5 to 48 hours, even more preferably 1 to 20 hours.

The fourth object of the present invention is to provide an orientation layer comprising one said siloxane oligomer, polymer or copolymer. More preferably the orientation layer further comprises a polymerisable liquid crystal.

In the context of the present invention the wording "polymer or oligomer layer" has the meaning of "polymer layer, copolymer layer, homopolymer layer or oligomer layer".

In the context of the present invention the wording "orientation layer" has the same meaning as "orientation film".

In the context of the present invention polymer or oligomer layers are preferably orientation layers.

The polymers, homo- or copolymers or oligomers according to the invention may be used in form of polymer layers or oligomer layers alone or in combination with other polymers, oligomers, monomers, photo-active polymers, photo-active oligomers and/or photo-active monomers, depending upon the application to which the polymer or oligomer layer is to be added. Therefore it is understood that by varying the composition of the polymer or oligomer layer it is possible to control specific and desired properties, such as an induced pre-tilt angle, or surpressing of tilt, good surface wetting, a high voltage holding ratio, a specific anchoring energy, etc.

The fifth object of the present invention is to provide a method for the preparation of the orientation layer by exposure of the siloxane oligomer, polymer or copolymer with aligning light.

The siloxane polymer, copolymer or oligomer, comprises in its polymer-, homo- or copolymer- or oligomer-side-chains at least one photo-reactive group. Preferably, the photo-reactive group of the side chains reacts by exposure to aligning light.

In the context of the present invention the term photoreactive groups have the meaning of groups, which are able to react by interaction with light, preferably aligning light.

The treatment with aligning light may be conducted in a single step or in several separate steps. In a preferred embodiment of the invention the treatment with aligning light is conducted in a single step.

In the context of the present invention photo-reactive group has preferably the meaning of a dimerizable, isomerizable, polymerizable and/or cross-linkable group.

In the context of the present invention, aligning light, preferably polarized light is light of wavelengths, which can initiate photoalignment. Preferably, the wavelengths are in the UV-A, UVB and/or UV/C-range, or in the visible range. It depends on the photoalignment compound, which wavelengths are appropriate. Preferably, the photo-reactive groups are sensitive to visible and/or UV light. A further embodiment of the invention concerns the generating of aligning light by laser light.

The instant direction of the aligning light may be normal to the substrate or at any oblique angle.

More preferably, aligning light is at least partially linearly polarized, elliptically polarized, such as for example circulary polarized, or non-polarized; most preferably at least circulary or partially linearly polarized light, or non-polarized light exposed obliquely.

Especially, most preferred aligning light denotes substantially polarised light, especially linearly polarised light; or aligning light denotes non-polarised light, which is applied by an oblique irradiation.

A more preferred embodiment of the invention relates to a method for the preparation of the orientation layer by exposure of the linear, branched or crosslinked siloxane oligomer, polymer or copolymer with polarised light, especially linearly polarised light, or by oblique radiation with non-polarised light.

Further preferred are siloxane polymers, homo- or copolymers or oligomers of the present invention,
wherein at least 1%, preferably at least 5%, more preferably at least 8%, most preferably at least 10%, especially most preferred at least 15%, more especially preferred at least, 30%, even more preferred at least 50%, 60% or 75% of the monomers include a side chain with a photo-reactive group; and/or
wherein, the photo-reactive groups are able to dimerize, isomerize, polymerize; crosslink and/or
wherein the polymer, homo- or copolymer or oligomer is a polymer gel or a polymer network, or an oligomer gel or an oligomer network, respectively; and/or
wherein the polymer, homo- or copolymer or oligomer has an intrinsic viscosity in the range of 0.01 to 10 dL/g, preferably in the range of 0.02 to 5 dL/g; and/or
wherein the polymer, homo- or copolymer or oligomer has a molecular weight of 1 to 6'000'000, 1'000 to 6'000'000, 2'000 to 1'000'000, 2'000 to 500'000, more preferably 5'000 to 100'000.
wherein the polymer, homo- or copolymer or oligomer contains from 2 to 15000 repeating units, especially from 5 to 2000 repeating units, more especially 6 to 500 repeating units; and/or
wherein the polymer, homo- or copolymer or oligomer is in the form of a homopolymer or of a copolymer, preferably of a statistical copolymer.

A further preferred embodiment of the present invention relates to siloxane polymers, copolymers or oligomers, having an intrinsic viscosity preferably in the range of 0.01 to 10 dL/g, more preferably in the range of 0.01 to 1 dL/g. Herein, the intrinsic viscosity ($\eta_{inh}=\ln \eta_{rel}/C$) is determined by measuring a solution containing a polymer, or copolymers or an oligomer in a concentration of 0.5 g/100 ml solution for the evaluation of its viscosity at 30° C. using N-methyl-2-pyrrolidone as solvent.

In addition, a preferred embodiment of the present invention relates to siloxane polymers, homo- or copolymers or oligomers, containing from 2 to 15000 monomers, especially from 5 to 2000 monomers, more especially 6 to 500.

Polymer or oligomer layers may readily be prepared from the siloxane polymers, copolymers or oligomers of the present invention and a further embodiment of the invention relates to a siloxane polymer, copolymer or oligomer layer comprising a siloxane polymer, copolymer or oligomer according to the present invention, which is preferably prepared by treatment with aligning light.

Preferably, the invention relates to a siloxane polymer-, copolymer-, or oligomer layer comprising a siloxane polymer, copolymer, or oligomer according to the present invention or as prepared according to the present invention.

The polymer or oligomer layer is preferably prepared by applying one or more siloxane polymers, copolymers or oligomers or compositions according to the invention to a support and, after imidisation or without imidisation, irradiating the polymer or oligomer or polymer mixture or oligomer mixture with aligning light. Aligning light has the above given meaning and preferences.

The term "support" as used in the context of the present invention is preferably transparent or not-transparent, preferably glass or plastic substrates, polymer films, such as polyethyleneterephthalat (PET), tri-acetyl cellulose (TAC), polypropylen, optionally coated with indium tin oxide (ITO), however not limited to them.

In general a composition comprising the siloxane polymers, copolymers or oligomers of the invention is applied by general coating and printing methods known in the art, such as spin-coating, meniscus-coating, wire-coating, slot-coating, offset-printing, flexo-printing, gravure-printing, ink jet printing may be used. Coating methods are for example spin coating, air doctor coating, blade coating, knife coating, reverse-roll coating, transfer roll coating, gravure roll coating, kiss roll coating, cast coating, spray coating, slot-orifice coating, calendar coating, electrodepositing coating, dip coating or die coating.

Printing methods are for example relief printing such as flexographic printing, ink jet printing, intaglio printing such as direct gravure printing or offset gravure printing, lithographic printing such as offset printing, or stencil printing such as screen printing. A further preferred embodiment of the present invention relates to orientation layers which are unstructured or structured.

In addition the present invention relates to a process for the preparation of structured siloxane polymer layers, copolymer layers or oligomer layers comprising varying the direction of orientation and/or the tilt angle within the polymer or oligomer layer. This varying of the direction of orientation and/or the tilt angle can for example be conducted by controlling the direction of the irradiation of the aligning light. It is understood that by selectively irradiating specific regions of the polymer or oligomer layer very specific regions of the layer can be aligned. In this way, layers with a defined tilt angle can be provided.

The irradiation time is dependent upon the output of the individual lamps and can vary from a few seconds to several hours. The photo-reaction can also be carried out, however, by irradiation of the homogeneous layer using filters that, for example, allow only the radiation suitable for the reaction to pass through.

Further preferred is a process for the preparation of a siloxane polymer layer, copolymer layer or oligomer layer; for the preparation of planar multi-domain alignment of a polymer layer or oligomer layer; and/or for the preparation of a polymer layer, copolymer or oligomer layer having a tilt angle within the given meaning and preferences of the invention.

A further preferred embodiment of the invention relates to an orientation layer comprising one or more siloxane polymers, copolymers or oligomers according to the invention.

In the context of the present invention orientation layer has the same meaning and preferences as alignment layer, polymer, homo- or copolymer or oligomer layer and is preferably a photo alignment layer.

In the context of the present invention, the orientation layer is used for the planar alignment (in plane switching) of liquid crystals or for the vertical alignment of liquid crystals.

In a more preferred embodiment the invention relates to an orientation layer according to the invention for the planar alignment of liquid crystals.

In the context of the present invention the wording "planar alignment of liquid crystals" means that the liquid crystals have tilt angle.

The term tilt angle as used in the context of the present invention is the angle between the liquid crystal director and the surface of the alignment layer. The liquid crystal director shall mean the average direction of the long axes of the liquid crystal molecules. In the context of the present invention, planar alignment shall mean that the tilt angle is less than 30°, preferably 0 to 30°.

In preferred embodiments the tilt angle of the liquid crystals, induced by the photo-alignment layer is less than 10°, preferably 0 to 10°. In more preferred embodiments the tilt angle is less than 5°, preferably 0 to 5°, and in most preferred embodiments the tilt angle is less than 1°, preferably 0 to 1°, even more preferably from 0° to 0.5°. Preferred are tilt angles of less than 0.2° or 0.1°.

The sixth embodiment of the present invention is the use of said orientation layer, for the alignment, especially the planar alignment, of a) liquid crystal composition comprising one or more polymerizable liquid crystal monomers, or comprising one or more liquid crystal polymers or oligomers, which are the polymerized form of said polymerizable liquid crystal monomers, and/or b) liquid crystal compositions comprising one or more polymerizable liquid crystal monomers, or comprising one or more liquid crystal polymers or oligomers, which are the polymerized form of said polymerizable liquid crystal monomers, said liquid crystal compositions being sandwiched between a pair of said orientation layers.

Examples of LCP are described in US2012/114907 A1, which is herewith incorporated by reference.

Further, the present invention relates preferably to the use of an orientation layer according to the invention for the induction of planar alignment of adjacent liquid crystalline layers, in particular for operating a cell wherein planar orientation is provided, such in IPS, such as IPS modes like S-IPS (Super IPS), AS-IPS (Advanced super IPS), E-IPS (Enhanced IPS), H-IPS (Horizontal IPS), UH-IPS, S-IPS II, e-IPS, p-IPS (performance IPS), PLS technology (plane to line switching), PS-IPS (polymer stabilized IPS), Field induced photoreactive alignment IPS FFS (fringe field switching), TN (twisted nematic), STN (supertwisted nematic).

Liquid crystal compositions of the present invention comprise a polymerizable monomer, or a polymer or oligomer, which is the polymerized form of said polymerizable monomer. The polymerizable monomer or the polymer or oligomer, is bifunctional and/or has a rigid core (e.g. benzene). Further preferred is a polymerizable monomer, or a polymer or oligomer, which have one or more ring or condensed ring structures and functional groups bonded directly to the ring or condensed ring structure.

More preferred liquid crystals have a monomer of formula (IV)

$$P_1\text{-}S_1\text{-}A_1\text{-}(Z_1\text{-}A_2)_n\text{-}S_2\text{-}P_2 \qquad (IV)$$

wherein $P_1$ and $P_2$ are functional groups and are independently selected from acrylate, methacrylate, halogenacrylate, such as fluoroacrylate, chloroacrylate; oxetanyl, maleinimidyl, allyl, allyloxy, vinyl, vinyloxy and epoxy groups, $S_1$ and $S_2$ are independently from each other a single bond or a spacer unit, which is preferably a straight-chain or branched, substituted or unsubstituted $C_1$-$C_{24}$alkylen, in which one or more, preferably non-adjacent, C-atom, CH- or $CH_2$—, group may be replaced by a linking group within the above given meaning and preferences, and, preferably replaced by is a single bond, —O—, —O(CO), —S—, —(CO)O— or

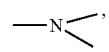

—$NR^2$—, and wherein the substituent is preferably at least one $C_1$-$C_6$alkyl, preferably methyl.

$A_1$ and $A_2$ are ring structures and independently selected from unsubstituted or substituted carbocyclic or heterocyclic aromatic or alicyclic group with the meaning and preferences given in the present invention, especially preferred are 1,4-phenylene naphthalene-2,6-diyl, terphenyl, quarterphenyl, phenanthrene groups, $Z_1$ is selected from —O—, —CO—, —CH(OH)—, —CH$_2$(CO)-, —OCH$_2$—, —CH$_2$O—, —O—CH$_2$—O-, —COO—, —OCO—, -(CO)-(CO)-, —OCF$_2$—, —CF$_2$O—, —CF$_2$—, -CON(C$_1$-C$_{16}$alkyl)-, -(C$_1$-C$_{16}$alkyl)NCO-, —CONH—, —NHCO—, —HNOCO—, —OCONH—, —NHCONH—, —OCOO—, —CO—S—, —S—CO—, —CSS, —SOO—, —OSO—, —SOS—, —SO—, —CH$_2$(SO)—, —SO$_2$—, —CH=CH—, —C≡C—, —CH=CH—COO—, —OCO—CH=CH—, —CH=N—, —C(CH$_3$)=N—, —N=N—, or a single bond; or a cyclic, straight-chain or branched, substituted or unsubstituted C$_1$-C$_{24}$alkylen, wherein one or more C-atom, CH- or CH$_2$-group may independently from each other be replaced by a linking group;

preferably, $Z_1$ is —O—, —CO—, —COO—, —OCO—, —OCOO—, —OCF$_2$—, —CF$_2$O—, —CON(CH$_3$)—, —(CH$_3$)NCO—, —CONH—, —NHCO—, —CO—S—, —S—CO—, —CSS, —SOO—, —OSO—, —CSS—, —SOO—, —OSO—, —CH$_2$(SO$_2$)—, —CH$_2$—CH$_2$—, —OCH$_2$—, —CH$_2$O—, —CH=CH—, —C≡C—, —CH=CH—COO—, —OCO—CH=CH—, or a single bond;

more preferably $Z_1$ is —COO—, —OCO—, —OCOO—, —OCF$_2$—, —CF$_2$O—, —CON(CH$_3$)—, —(CH$_3$)NCO—, —CONH—, —NHCO—, —CO—S—, —S—CO—, —CS—S—, —SOO—, —OSO, especially —COO—, —OCO—, —OCF$_2$—, —CF$_2$O—, —CON(CH$_3$)—, —(CH$_3$)NCO—, —CONH—, —NHCO— or a single bond, most preferred $Z_1$ is a single bond, —COO— or —OCO—; and n is an integer of 1, 2, or 3.

In formula (II), P$_1$ and P$_2$ are preferably acrylate or methacrylate groups, S$_1$ and S$_2$ are a single bond Z$_1$ is preferably a single bond, and n is preferably 0 or 1.

Most preferred is a compound represented by any one of the formulae (V), (VI) or (VII)

wherein P$_1$ and P$_2$ are independently from each other an acrylate, methacrylate, oxetane, maleinimide, allyl, allyloxy, vinyl, vinylamide, vinyloxy and epoxy group, epoxy derivatives, butoxy and butoxy derivatives, B is a single bond, —CO—C(C$_1$-C$_6$alkoxy)$_2$-, —COO—, —OCO—, $Y_1, Y_2, Y_3, Y_4, Y_5, Y_6$ are independently from each other hydrogen, a straight-chain or branched C$_1$-C$_{16}$alkyl group, which is unsubstituted or substituted by fluorine, di-(C$_1$-C$_{16}$alkyl)amino, C$_1$-C$_{15}$alkyloxy, nitro, nitrile and/or chlorine; and wherein one or more C-atom, CH— or CH$_2$—group may independently from each other be replaced by a linking group; halogen or nitrile; preferred substituents are C$_1$-C$_6$alkyl group, especially methyl or ethyl, C$_1$-C$_6$alkoxy group, especially methoxy or ethoxy, chlorine, fluorine, or nitrile, more preferably methoxy, chlorine, fluorine, or CN and most preferably methoxy, chlorine or fluorine; further, if the aromatic group is substituted, then it is preferably substituted once or twice;

S$_1$, S$_2$, are independently from each other a single bond or a spacer unit, as described above.

In formula (IV), P$_1$ and P$_2$ are preferably acrylate or methacrylate groups, S$_1$ and S$_2$ are a single bond Z$_1$ is preferably a single bond, and n is preferably 0 or 1.

In formulae (V) and (VII) a substituent group for the benzene ring is present at the o-position, m-position, or p-position. In formula (VI), a substituent group for the naphthalene ring is present at the o-position, m-position, p-position, ana-position, E (epi)-position, kata-position, pen-position, pros-position, amphi-position, or 2,7-position. The substituent group for the benzene ring is preferably present at the p-position among the above positions. The substituent group for the naphthalene ring is preferably present at the amphi-position among the above positions.

Preferred are:

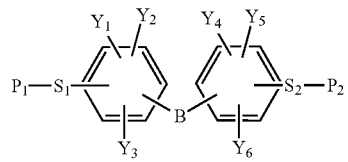

(V)

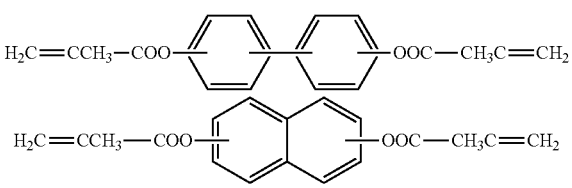

(VI)

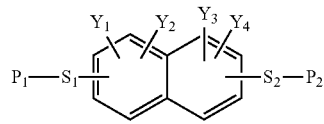

(VIa)

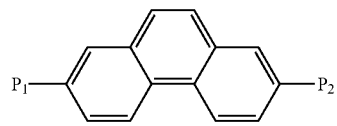

(VII)

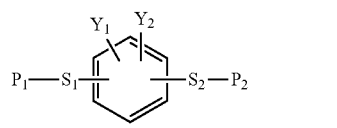

(VIb)

In general the liquid crystals compositions or liquid crystal layers are not particularly limited, provided that they contain the mono- or/and multi-polymerizable monomer described above. The liquid crystals compositions or liquid crystal layers can thus be made of any of various liquid crystal materials that have been known publicly. The liquid crystals compositions or liquid crystal layers may be made of a liquid crystal material identical to or different from that for display use.

The oligomer, which is the polymerized form of the polymerizable monomer, is in general not limited to any molecular weight. Preferably the molecular weight is in the range of 200 to 5000 Dalton, more preferably in the range of 500 to 2000 Dalton and most preferred in the range of 500 to 1000 Dalton.

In the seventh embodiment the present invention relates to a method for manufacturing a liquid crystal display.

In the context of the present invention the term "display" has the same meaning as the term "panel".

The method for producing the liquid crystal display panel may involve using a polymerization initiator, such as methyl ethyl ketone peroxide and a benzoyl ether-based compound.

Preferably, the present invention relates to a method for manufacturing a liquid crystal display comprising applying at least a single LCP onto a siloxane polymer, copolymer or oligomer layer according to the first or second embodiment, or preferably on the orientation layer according to the fourth embodiment of the present invention, and polymerizing said LCP.

In general the polymerization of the LCP is conducted by irraditation or at elevated temperature.

The LCP may be applied onto the orientation layer in any amount, so the amount is not particularly limited. The amount may be set as appropriate in accordance with, for example, respective thicknesses of the LCP polymer films formed by polymerization of the monomeric LCP.

Further the present invention relates to a method for manufacturing a liquid crystal display comprising bringing into contact a liquid crystal composition comprising a polymerizable liquid crystal monomer according to the present invention, or a polymer or oligomer, which is the polymerized form of said poylmerizable liquid crystal monomer; with at least a single orientation layer according to the present invention, preferably two orientation layers facing each other; and polymerising said polymerizable liquid crystal monomer.

Generally the polymerization methods are not limited so far as they have no adverse effects on the manufactured device. Preferably the polymerization is conducted by irradiation, especially UV radiation, or by heat.

More specifically the process for the preparation of liquid crystal displays, preferably LCDs comprising planar alignment of liquid crystals, more especially LCDs comprising the IPS mode, comprising an orientation layer according to the present invention and electrodes, comprises performing an exposure, preferably a first exposure, of the material with the polarised light, wherein the exposure induces an orientation direction of the liquid crystals perpendicular to polarised light, or/and wherein an exposure, preferably a first exposure, induces an orientation direction of the liquid crystals and polarised light direction make an angle higher than 70°, or/and wherein an exposure, preferably a first exposure, with polarized light is conducted with an angle >70° between the electrode and the polarized light direction.

The eight object of the present invention relates to optical or electro-optical unstructured of structured elements comprising the siloxane oligomer, polymer or copolymer or the orientation layer.

In a preferred embodiment the element is a liquid crystal display cell.

In the context of the present invention elements, device, cell, structure all refer to objects comprising polymerized or polymerizable liquid crystal to be oriented with the linear, branched or crosslinked siloxane polymer, copolymer or oligomer according to the present invention.

Preferably, the present invention further relates to unstructured or structured elements optical or electrooptical devices, especially a LCD, comprising a pair of substrates facing each other; wherein the substrates is provided with a pair of orientation layers according to the present invention and
 a) optionally, a LCP polymer film, wherein said polymer film is formed on that orientation layer, or
 b) a liquid crystal composition, preferably comprising a polymer made from at least a polymerizable liquid crystal monomer, wherein said liquid crystal composition is sandwiched between the pair of orientation layers.

The present invention also relates to the use of such orientation layers for the alignment, preferably planar alignment, of liquid crystals, preferably in the manufacture of unstructured or structured optical- or electro-optical elements, preferably in the production of hybrid layer elements. Preferably, these optical or electro-optical devices have at least one orientation layer as well as unstructured and structured optical elements and multi-layer systems. The layer or each of the layers may contain one or more regions of different spatial orientation.

Polarised light direction shall mean the intersection line of the alignment layer surface and the plane of polarization of the polarised light during the exposure. If the polarised light is elliptically polarized, the plane of polarization shall mean the plane defined by the incident direction of the light and by the major axis of the polarization ellipse.

The term polarised light direction is used in the context of the present invention not only to describe a direction for the duration of the exposure process, but also after exposure to refer to the direction of the polarised light on the alignment layer as it was applied during exposure.

The electrodes are preferably in the form of parallel stripes, zig-zag or comb-like electrodes.

Preferably, the present invention concerns an optical and electro-optical unstructured or structured constructional elements, preferably liquid crystal display cells, multi-layer and hybrid layer elements, comprising at least one polymer layer, copolymer or oligomer layer according to the present invention.

The present invention the wording optical or electro-optical elements has preferably the meaning of multilayer systems, or devices for the preparation of a display waveguide, a security or brand protection element, a bar code, an optical grating, a filter, a retarder, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non linear optical properties, a decorative optical element, a brightness enhancement film, a component for wavelength-band-selective compensation, a component for multi-domain compensation, a component of multiview liquid crystal displays, an achromatic retarder, a polarization state correction/adjustment film, a component of optical or electro-optical sensors, a component of brightness enhancement film, a component for light-based telecommunication devices, a G/H-polarizer with an anisotropic absorber, a reflective circular polarizer, a reflective linear polarizer, a MC (monomer corrugated film), twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, PLS technology (plane to line switching), PS-IPS (polymer stabilized IPS), in-plane switching (IPS) liquid crystal displays, such as IPS modes like S-IPS (Super IPS), AS-IPS (Advanced super IPS), E-IPS (Enhanced IPS), H-IPS (Horizontal IPS), UH-IPS, S-IPS II, e-IPS, p-IPS (performance IPS); Field induced photoreactive alignment IPS, fringe field switching (FFS) liquid crystal displays; (FPA) field-induced photo-reactive alignment; hybrid FPA; VA-IPS mode liquid crystal displays, or displays using blue phase liquid crystals; all above display types are applied in either transmissive or reflective or transflective mode.

More preferred optical or electro-optical elements are PLS technology (plane to line switching), PS-IPS (polymer stabilized IPS), in-plane switching (IPS) liquid crystal displays, such as IPS modes like S-IPS (Super IPS), AS-IPS (Advanced super IPS), E-IPS (Enhanced IPS), H-IPS (Horizontal IPS), UH-IPS, S-IPS II, e-IPS, p-IPS (performance IPS); Field induced photoreactive alignment IPS, fringe field switching (FFS) liquid crystal displays; (FPA) field-induced photo-reactive alignment; hybrid FPA; VA-IPS mode liquid crystal displays, or displays using blue phase liquid crystals; all above display types are applied in either transmissive or reflective or transflective mode.

The advantages of the present invention could not be foreseen by a skilled person. It has surprisingly been found, that the siloxane polymers of the present invention, upon irradiation with polarized light, orient polymerized or polymerizable liquid crystals. Further, said photo-alignment material shows good and homogenous planar orientation quality. The further examples will demonstrate that the linear, branched or crosslinked siloxane polymers, copolymers or oligomers of the present invention have good or very good image sticking properties, contrast ratios, and voltage holding ratios.

The further examples are a non-limiting selection of examples which will further explain the invention.

EXAMPLES

Definitions Used in the Examples $^1$H NMR: $^1$H nuclear magnetic resonance spectroscopy
DMSO-d$_6$:dimethylsulfoxide deuterated
300 MHz: 300 Megahertz
M: multiplet
D: doublet
Dd: doublet doublet
t: triplet
s: singulet
q: quadruplet
qi: quintet
br: broad peak
HCl: hydrogen chloride
HCl solution (25%): volume percent
NaOH: sodium hydroxide
NaOH (30%): weight percent
MeOH: methanol
EtOAc: ethyl acetate
NMP: N-methyl-2-pyrrolidone
THF: tetrahydrofuran
TBME: tert. butyl methyl ether
DMF: N,N-dimethylformamide
DBU: 1,8-Diazabicyclo[5.4.0]undec-7-ene
NaHCO$_3$: sodium bicarbonate
H$_2$SO$_4$: sulphuric acid
RT: room temperature, usually in the range of 18° C. to 28° C.
[η]: viscosity
v.t. %: volume percent
GPC: Gel permeation chromatography. GPC is measured with UV detector and with polystyrene as standards.
Mw: Molecular weight
PI: Polydispersity index
MLC7067: is a mixture of liquid crystal available from Merck KGA with a dielectric anisotropy of 10.3, an optical anisotropy of 0.1025 and a rotational viscosity of 81 m.Pa·s.

Preparation of 4-(3-nitrilepropoxy)benzoic Acid 1a 46.8 g (307 mmol) of methyl-4-hydroxybenzoate, 50 g (338 mmol) of 4-bromobutanenitrile are dissolved in 535 mL of NMP. 5.1 g (31 mmol) of potassium iodide and 128 g (93 mmol) of potassium carbonate are added and the suspension is heated up to 80° C. After 48h, a mixture of 15 g of sodium hydroxide and 49 ml of water is added. The reaction mixture is heated up to 100° C. for 5 hours. Then the solution is cooled down and 480 mL of water is added. The aqueous layer is removed and the organic layer is poured to 1.5 L of icy water. 81 mL of a 25% HCl solution is added. The precipitate is filtered off and washed with 250 mL of water. The resulting product is incorporated in 600 mL of MeOH. The suspension is then stirred for 1 hour and filtered off to give 50.1 g (80%) of 4-(3-nitrilepropoxy) benzoic acid as a white powder used without further purification.

The benzoic acid compounds 1b, 1c, 1d, 1l are prepared according to the process described for compound 1a with the proviso that 4-bromobutanenitrile is replaced by 7-bromo-heptanitrile, respectively 1-bromobut-2-yne, respectively 1-bromopent-2-yne, respectively 5-bromopentanenitrile.

The benzoic acid compounds 1e, 1f, 1g, 1h, 1m, 1n are prepared according to the process described for compound 1a with the proviso that methyl 4-hydroxybenzoate is replaced by methyl 3-fluoro-4-hydroxybenzoate, respectively 4'-hydroxybiphenyl-4-carboxylic acid methyl ester, respectively methyl 3,5-dihydroxybenzoate, respectively methyl 3-hydroxybenzoate, respectively methyl 4-hydroxy-3,5-dimethyl-benzoate, respectively methyl 4-hydroxy-3-methoxy-benzoate.

Preparation of 4-(2-methoxyethoxy)benzoic Acid 1i 4.3 mL (37.5 mmol) of methoxyethanol and 10.1 g (37.5 mmol) of triphenylphosphine are added to a solution of 61 g (30 mmol) of methyl 4-hydroxybenzoate in 120 ml of THF at room temperature. 7.7 mL (37.5 mmol) of diisopropyl azodicarboxylate (DIAD) in 110 mL of THF are incorporated slowly so that the temperature is maintained to 10° C. After 18 hours at room temperature, the reaction mixture is poured onto icy water and acidified with a 1N HCl solution. The aqueous phase is extracted with ethyl acetate and the organic phase is then washed repeatedly with water, dried over sodium sulfate, filtered and concentrated by rotary evaporation. Chromatography of the residue using cyclohexane: ethyl actetate 4:1 yielded 6.6 g (98%) of pure methyl 4-(2-methoxyethoxy)benzoate as a white powder. 4.3 g (64.95 mmol) of potassium hydroxide is added to a solution of 6.1 g (29 mmol) of methyl 4-(2-methoxyethoxy) benzoate in 100 mL of EtOH. The solution is heated up to reflux for one hour and poured onto icy water and acidified with a 25% HCl solution. The mixture is filtered off and washed 2 times with 100 mL of water. The solid is suspended in 100 ml of acetonitrile for 1 hour and the precipitate is filtered off and dried under pressure to yield 3.9 g (70%) of pure 4-(2-methoxyethoxy)benzoic acid as a white powder.

Preparation of 4-(4-hydroxyphenoxy)butanenitrile Compound 1j

To a solution of 1.7 g of NaOH in 80 ml of H$_2$O:dioxane 1:1, 2.2 g (20 mmol) of hydroquinone are added. The solution is stirred for 15 min. Then, 3.5 g (24 mmol) of 3-bromopropanitrile is dropwise added. After complete addition, the mixture is heated up to reflux and stirred for 24 hours. 45 mL of a 1N HCl solution is added to the above mixture. The solution is extracted with ethylacetate and concentrated under reduced pressure to give 2.8 g of 4-(4-hydroxyphenoxy)butanenitrile which is used without further purification.

The benzoic acid compounds 1 k is prepared according to the process described for compound 1i with the proviso that methoxyethanol is replaced by ethoxyethanol. The benzoic acid compounds 1x is prepared according to the process described for compound 1i with the proviso that methyl 4-hydroxybenzoate is replaced by methyl 3-fluoro-4-hydroxy-benzoate.

Preparation of (2E)-3-(4-{[4-(3-nitrilepropoxy)benzoyl]oxy}phenyl)prop-2-enoic Acid 2a 16.8 g (82 mmol) of 1a is suspended in 56 mL of toluene and few drops of DMF are added. The suspension is heated up to 75° C. and 10.7 g (90 mmol) of thionylchloride are added. After 2 hours, the excess of thionyl chloride is removed under pressure. The solution is cooled down to room temperature. 10.2 g (83 mmol) of 4-hydroxybenzaldehyde 0.5 g (4 mmol) of 4-diaminopyridine and 28 g (355 mmol) of pyridine are added. After 3 hours, 14.5 g (140 mmol) of malonic acid and 3 g (42 mmol) of pyrrolidine are added. The reaction mixture is allowed to react at 80° C. for 30 min. 16.8 mL of MeOH are then incorporated and the suspension is cooled down and kept at 0° C. for 1 hour. The product is filtered off and suspended for 2 hours in a solution of 57 mL of MeOH, 11 mL of water and 7.5 g of a 25% HCL solution. The solid is filtered off and washed with MeOH and heptane. The product is crystallized in acetonitrile to give 23 g of (2E)-3-(4-{[4-(3-nitrilepropoxy)benzoyl]oxy}phenyl)prop-2-enoic acid as a white powder.

The compounds 2b, 2c, 2d, 2e, 2f, 2g, 2h, 2i, 3k, 2l, 2m, 2n, 2x are prepared according to the process described for compound 2 with the proviso that compound 1a is replaced by compound 1b, respectively 1c, respectively 1d, respectively 1e, respectively 1f, respectively 1g, respectively 1h, respectively 1i, respectively 1k, respectively 1l, respectively 1m, respectively 1n, respectively 1x.

The compounds 2k, 2o, 2p, 3b are prepared according to the process described for compound 2a with the proviso that 4-hydroxybenzaldehyde is replaced by 4-hydroxy-3-methoxy-benzaldehyde, respectively 2-fluoro-4-hydroxy-benzaldehyde, respectively 4-aminobenzaldehyde, respectively methyl 5-formyl-2-hydroxy-benzoate.

The compounds 2r, 2s, 2t, 2u, 2v, 2w, 2y are prepared according to the process described for compound 2a with the proviso that 4-(3-nitrilepropoxy)benzoic acid 1a is replaced by 4-(2-prop-2-enoyloxyethoxy)benzoic acid, respectively 4-methoxycarbonylbenzoic acid, respectively 4-methoxycyclohexanecarboxylic acid, respectively 4-(dimethylamino) benzoic acid, respectively 1,3-benzodioxole-5-carboxylic acid, respectively 4-(acetoxymethyl)benzoic acid, respectively 4-methoxycarbonylcyclohexanecarboxylic acid.

The compound 2q is prepared according to the process described for compound 2a with the proviso that 4-hydroxybenzaldehyde is replaced by 4-formylbenzoic acid and 4-(3-nitrilepropoxy)benzoic acid 1a is replaced by 4-(4-hydroxyphenoxy)butanenitrile 1j.

The compound 2z is prepared according to the process described for compound 2a with the proviso that 4-hydroxybenzaldehyde is replaced by 2-fluoro-4-hydroxy-benzaldehyde and 4-(3-nitrilepropoxy)benzoic acid 1a is replaced by 4-(2-methoxyethoxy)benzoic acid ii.

Preparation of the Polymer P1

49.2 g of compound 2a are suspended in 375 ml of 4-Methyl-2-pentanone and water. 1.5 g of ammonium catalyst are added to give a white suspension. 38.4 g of 2-(3,4-Epoxycyclohexyl)ethyltriethoxysilane are added dropwise. The mixture is stirred at reflux for 48h. The suspension is allowed to cool down. The upper liquid phase is removed. The resulting yellowish solution is poured slowly into 1.5 L of cold tert-butyl methyl ether. The solid is filtered off to give 70 g of polymer after drying.

The compounds P2, P3, P4, P5, P6, P7, P8, P9, P10, P14, P15, P16, P20, P21, P22, P23, P24, P26, P27, P30, P31, P32, P33, P34, P35, P36 are prepared according to the process described for polysiloxane P1 with the proviso that compound 2a is replaced by compound 2b, respectively 2c, respectively 2d, respectively 2e, respectively 2f, respectively 2g, respectively 2h, respectively 2i, respectively 2k, respectively 2o, respectively 2p, respectively 2q, respectively 3k, respectively 2l, respectively 2m, respectively 2n, respectively 2x, respectively 2s, respectively 2t, respectively 2w, respectively 2y, respectively 2z, respectively 2r, respectively 2u, respectively 2v, respectively 3b.

Preparation of the Polymer P17

2.37 g (6.76 mmol) of compound 2a are suspended in 15 ml of 4-methyl-2-pentanone. 0.082 g of ammonium catalyst and 1.2 g of epoxycyclohexylethyl polysilsesquioxane (EP0408 manufactured by Hybrid Plastics) are added to give a white suspension. The mixture is stirred at reflux for 24h. The suspension is then allowed to cool down. The upper liquid phase is removed. 25 mL of tetrahydrofuran are added to give a solution. The resulting yellowish solution is poured slowly into 150 mL of tertbutylmethylether. The solid is filtered and washed with 20 mL of tert-butyl methyl ether. The resulting white solid is dried under vacuum to give P17.

Preparation of the Polymer P19

2 g (5.69 mmol) of compound 2a are suspended in 15 ml of 4-methyl-2-pentanone. 0.200 g of ammonium catalyst and 1.61 g (6.26 mmol) dimethoxy-methyl-[2-(7-oxabicyclo [4.1.0]heptan-4-yl)ethyl]silane are added to give a white suspension. The mixture is stirred at reflux for 24h. The suspension is then allowed to cool down. 25 mL of tetrahydrofuran are added to give a solution. The resulting yellowish solution is poured slowly into 200 mL of cold tertbutylmethylether. The solid is filtered and washed with 20 mL of tert-butyl methyl ether. The resulting white solid is dried under vacuum to give 1.24 g of P19.

| Polymer | Structure of the side chain | Mw determined by GPC | $^1$H NMR (300 MHz) in THF-d$_8$ |
|---|---|---|---|
| P1 | (structure shown) | 17620 DA (PI: 1.38) | 8.06 (br., 2H), 7.61 (br., 3H), 7.2-6.95 (br., 4H), 6.49 (br., 1H), 4.91 (d, 1H), 4.12 (br., 3H), 3.77 (d, 1H), 2.57 (br., 2H), 2.07 (br., 2H), 1.9-1.2 (br., 9H), 0.75 (br, 2H). |

-continued

| Polymer | Structure of the side chain | Mw determined by GPC | ¹H NMR (300 MHz) in THF-d$_8$ |
|---|---|---|---|
| P4 | 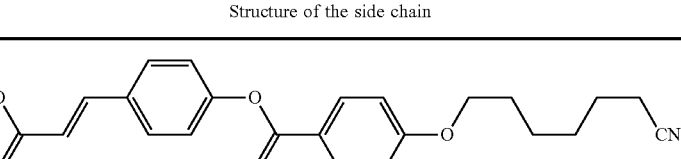 | 10310 DA (PI: 1.12) | 8.11 (br., 2H), 7.68 (br., 3H), 7.26 (br., 2H), 7.09 (br., 2H), 6.56 (br., 1H), 4.89 (br., 3H), 4.25 (br., 1H), 3.82 (br., 1H), 2.23 (br., 2H), 2.1-1.2 (br., 12H), 0.71 (br, 2H). |
| P19 | | 3930 DA (PI: 1.05) | 8.11 (d, 2H), 7.68 (m, 3H), 7.27 (2H, d), 7.06 (d, 2H), 6.54 (d, 1H), 4.9 (d, 1H), 4.18 (br., 3H), 3.78 (d, 1H), 2.61 (t, 2H), 2.12 (q, 2H), 1.95 (br. 1H), 1.37 (br., 8H), 0.72 (br., 2H), 0.18 (s, 3H) |
| P17 | | 11121 DA (PI: 1.15) | 8.09 (br., 2H), 7.63 (br., 3H), 7.22 (br., 2H), 7.02 (br., 2H), 6.51 (br., 1H), 4.91 (d, 1H), 4.14 (br., 3H), 3.77 (d, 1H), 2.58 (br., 2H), 2.10 (br., 3H), 1.47 (br., 8H), 0.71 (br., 2H). |
| P9 | | 31730 DA (PI: 1.99) | 8.05 (br., 3H), 7.65 (br., 2H), 7.11 (br., 4H), 6.51 (br., 1H), 4.96 (br., 1H), 4.4-3.8 (br., 4H), 3.65 (br., 2H), 3.78 (br., 3H), 2.2-1.1 (br., 9H), 0.86 (br, 2H). |

| Polymer | Structure of the side chain | Mw determined by GPC | ¹H NMR (300 MHz) in DMSO-d$_6$ |
|---|---|---|---|
| P2 | 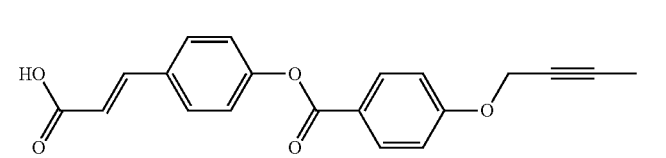 [SMILES: CC#CCOc1ccc(C(=O)Oc2ccc(/C=C/C(=O)O)cc2)cc1] | 16300 DA (PI: 1.2) | 7.97 (br., 2H), 7.57 (br., 3H), 6.7 (br., 1H), 4.77 (d, 2H), 3.97 (br., 2H), 3.67 (d, 1H), 2.55 (br., 2H), 1.9-1.2 (br., 17H), 0.78 (br., 2H). |
| P3 | | 10270 DA (PI: 1.20) | 8.04 (br., 2H), 7.63 (br., 3H), 7.14 (br., 4H), 6.56 (br., 1H), 4.91 (br., 3H), 3.66 (br., 1H), 2.1-1.0 (br., 12H), 0.64 (br, 2H). |
| P10 | 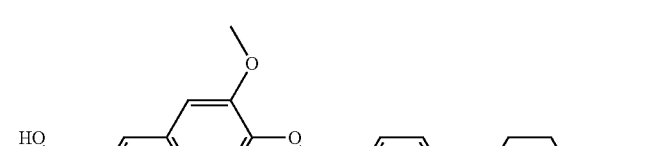 | 11154 DA (PI: 1.3) | 8.03 (br., 2H), 7.54 (br., 2H), 7.10 (br., 4H), 6.58 (br., 1H), 4.81 (br., 2H), 4.14 (br., 2H), 3.73 (br., 4H), 2.67 (br., 2H), 2.06 (br., 3H), 1.9-1.0 (br., 8H), 0.57 (br., 2H). |
| P7 | 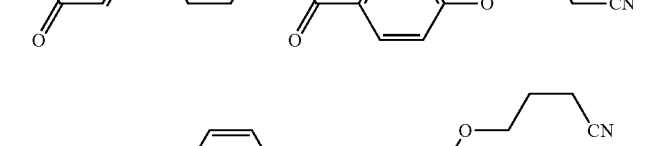 | 25220 DA (PI: 3.11) | 7.61 (br., 2H), 7.2 (br., 4H), 6.81 (br., 2H), 6.45 (br., 1H), 4.81 (br., 2H), 4.08 (br., 4H), 3.63 (br., 1H), 2.62 (br., 4H), 2.01 (br., 4H), 1.9-1.0 (br., 9H), 0.69 (br., 2H). |

-continued

| Polymer | Structure of the side chain | Mw determined by GPC | $^1$H NMR (300 MHz) in DMSO-$d_6$ |
|---|---|---|---|
| P6 | (structure) | 13100 DA (PI: 1.4) | 8.2-7.4 (br., 9H), 7.01-7.4 (br., 3H), 6.7 (br., 1H), 6.53 (br., 1H), 4.85 (br., 2H), 4.06 (br., 2H), 3.59 (br., 1H), 2.62 (br., 2H), 2.04 (br., 2H), 1.9-1.0 (br., 9H), 0.69 (br., 2H). |
| P14 | (structure) | 38190 DA (PI: 3.5) | 8.2-7.4 (br., 5H), 7.07 (br., 3H), 6.55 (br., 1H), 4.76 (d, 2H), 4.09 (br., 2H), 3.64 (d, 1H), 2.66 (br., 2H), 2.10-0.95 (br., 11H), 0.6 (br, 2H). |
| P5 | (structure) | 354300 DA (PI: 19.07) | 7.4 (br., 8H), 6.43 (br., 1H), 4.92 (br., 2H), 4.17 (br., 2H), 3.65 (br., 1H), 2.66 (br., 2H), 2.2-1 (br., 11H), 0.61 (br, 2H). |
| P16 | (structure) | 926200 DA (PI: 42) | 8.1-7.6 (br., 5H), 6.97 (br., 4H), 6.52 (br., 1H), 4.79 (br., 2H), 4.2-3.4 (br., 3H), 2.6 (br., 2H), 2.1-0.9 (br., 11H), 0.66 (br, 2H). |
| P8 | (structure) | 417000 DA (PI: 20.9) | 8.2-7 (br., 8H), 6.70 (br., 1H), 6.50-6.10 (br., 1H), 4.79 (br., 2H), 4.20-3.40 (br., 3H), 2.61 (br., 2H), 2.07 (br., 2H), 2.2-1.00 (br., 11H), 0.57 (br, 2H). |
| P15 | (structure) | 9690 DA (PI: 3.5) | 7.88 (br., 3H), 7.64 (br., 2.3H), 7.06 (br., 1.5H), 6.47 (br., 0.75H), 4.8 (br., 1.5H), 4.10 (br., 1.5H), 3.66 (d, 0.75H), 2.66 (br., 1.5H), 2.1-1.0 (br., 10.5H), 0.61 (br, 2H). |
| P20 | (structure) | 11230 DA (PI: 1.2) | 7.9 (br., 2H), 7.6 (br., 3H), 7.1 (br., 4H), 6.5 (br., 1H), 4.9 (d, 2H), 4.2 (br., 2H), 3.7 (br., 2H), 3.5 (br., 3H), 1.9-1.2 (br., 12H), 0.6 (br., 2H). |
| P31 | (structure) | 13220 DA (PI: 1.4) | 7.6 (br., 3H), 7.1 (br., 2H), 6.4 (br., 1H), 4.7 (br., 2H), 3.6 (br., 5H), 2.4-1.2 (br., 18H), 0.6 (br, 2H). |

| Polymer | Structure of the side chain | Mw determined by GPC | $^1$H NMR (300 MHz) in THF-$d_8$ |
|---|---|---|---|
| P21 | (structure) | 14500 DA (PI: 1.2) | 8.0 (br., 2H), 7.6 (br., 3H), 7.2 (br., 2H), 7.0 (br., 2H), 6.5 (br., 1H), 4.9 (br., 1H), 4.5-3.6 (br., 4H), 2.2-1.2 (br., 13H), 0.8 (br, 2H). |

-continued

| Polymer | Structure of the side chain | Mw determined by GPC | $^1$H NMR (300 MHz) in THF-d$_8$ |
|---|---|---|---|
| P22 | (structure) | 13170 DA (PI: 1.2) | 7.9 (br., 2H), 7.7 (br., 3H), 7.2 (br., 2H), 6.5 (br., 1H), 4.9 (br., 1H), 4.6-3.6 (br., 4H), 2.5 (br., 2H), 2.2-1.2 (br., 11H), 0.8 (br, 2H). |
| P23 | (structure) | 70950 DA (PI: 5.1) | 7.5 (br., 5H), 7.2 (br., 3H), 6.5 (br., 1H), 5.0 (br., 1H), 4.6-4 (br., 3H), 3.9 (br., 4H), 2.6 (br., 2H), 2.1 (br., 2H) 2.0-1.2 (br., 9H), 0.8 (br, 2H). |
| P24 | (structure) | 11500 DA (PI: 1.3) | 7.9 (br., 2H), 7.6 (br., 3H), 7.2 (br., 3H), 6.5 (br., 1H), 4.9 (br., 1H), 4.2 (br., 3H), 3.9 (br., 1H), 3.7 (br., 2H), 3.4 (br., 3H), 2.2-1.2 (br., 9H), 0.8 (br, 2H). |
| P33 | (structure) | 48000 (PI: 2.0) | 8.1 (br., 2H), 7.7 (br., 2H), 7.3 (br., 2H), 7.1 (br., 2H), 6.5 (br., 1H), 6.4 (br., 1H), 6.2 (dd, 1H), 5.9 (br., 1H), 4.9 (br., 1H), 4.5 (br., 2H), 4.3 (br., 3H), 3.9 (br., 1H), 3.01 (br., 0.5), 2.3-1.1 (br., 13.5H), 0.8 (br, 3H). |
| P26 | (structure) | 39000 DA (PI: 1.5) | 8.1 (br., 4H), 7.7 (br., 3H), 7.3 (br., 2H), 6.5 (br., 1H), 4.2 (br., 1H), 3.9 (br., 4H), 2.3-1.1 (br., 9H), 0.8 (br, 2H). |
| P27 | (structure) | 16100 DA (PI: 1.4) | 7.6 (br., 3H), 7.1 (br., 2H), 6.5 (br., 1H), 4.9 (br., 1H), 4.2 (br., 1H), 3.8 (br., 1H), 3.4 (br., 1H), 3.3 (br., 3H), 2.6 (br., 1H), 2.2-1.1 (br., 17H), 0.8 (br, 2H). |
| P34 | (structure) | 22600 DA (PI: 1.4) | 8.0 (br., 2H), 7.7 (br., 3H), 7.3, (br., 2H), 6.80 (br., 2H), 6.50 (br., 1H), 4.9 (br., 1H), 4.20 (br., 1H), 3.1 (br., 6H), 2.2-1.1 (br., 9H), 0.8 (br, 2H). |
| P35 | (structure) | 74000 DA (PI: 1.2) | 7.7 (br., 5H), 7.3 (br., 2H), 7.0 (br., 1H), 6.5 (br., 1H), 6.1 (br., 2H), 4.9 (br., 1H), 4.2 (br., 1H), 3.9 (br., 1H), 2.2-1.0 (br., 9H), 0.8 (br, 2H). |
| P30 | (structure) | 10600 DA (PI: 1.2) | 8.1 (br., 2H) 7.7 (br., 3H), 7.4 (br., 2H), 7.3 (br., 2H), 6.6 (br., 1H), 5.2 (br., 2H), 4.9 (br., 1H), 4.2 (br., 1H), 3.8 (d, 1H), 2.2-1.1 (br., 12H), 0.8 (br, 2H). |

| Polymer | Structure of the side chain | Mw determined by GPC | $^1$H NMR (300 MHz) in THF-$d_8$ |
|---|---|---|---|
| P32 | (structure: HOOC-CH=CH- attached to fluorophenyl ester linked via benzoate to -O-CH$_2$CH$_2$-O-) | 820000 DA (PI: 35) | 8.1 (br., 2H), 7.7 (br., 2H), 7.0 (br., 3H), 6.6 (br., 2H), 4.9 (br., 1H), 4.2 (br., 3H), 3.7 (d, 2H), 3.4 (br., 3H), 2.2-1.2 (br., 9H), 0.8 (br, 2H). |
| P36 | (structure: HOOC-CH=CH- attached to phenyl with ortho -C(O)O-CH$_3$ ester, linked via benzoate to -O-CH$_2$CH$_2$-CN) | 6200000 DA (PI: 257) | 8.0 (br., 3H), 7.7 (br., 2H), 7.2 (br., 3H), 6.5 (br., 1H), 4.6 (br., 2H), 3.9 (br., 4H), 2.6 (br., 2H), 2.1 (br., 2H), 2.0-1.2 (br., 9H), 0.8 (br, 2H). |

Preparation of Copolymer P25

10 g (28.46 mmol) of compound 2a are suspended in 75 ml of 4-methyl-2-pentanone and water. 0.299 g (1.42 mmol) of ammonium catalyst are added to give a white suspension. 3.88 g (13.66 mmol) of 2-(3,4-epoxycyclohexyl)ethylmethyldiethoxysilane and 3.53 g (13.66 mmol) of 2-(3,4-epoxycyclohexyl)ethyltriethoxysilane are added dropwise. The mixture is stirred at reflux for 48h. Then, the suspension is allowed to cool down. The upper liquid phase is removed and the polymer is rinsed with 25 ml of 4-Methyl-2-pentanone. 30 mL of tetrahydrofurane and 50 ml of ethylacetate are added and the mixture is extracted with 15 ml of water. The resulting solution is poured slowly into 1 L of cold tert-butyl methyl ether. The solid is filtered off and dried under vacuum to give 8.66 g of copolymer.

Mw: 12430 DA (PI:1.29)

$^1$H NMR (300 MHz) in DMSO-$d_6$: 8.09 (br., 2H), 7.68 (br., 3H), 7.07 (br., 4), 6.51 (br., 1H), 4.78 (br., 2H), 4.11 (br., 2H), 3.64 (br., 1H), 2.65 (br., 2H), 2.05 (br., 2H), 1.95-0.95 (br., 9H), 0.62 (br., 2H), 0.18 (br., 1.22H)

Preparation of the Copolymer P28

5 g (14.23 mmol) of compound 2a are suspended in 37.5 ml of 4-methyl-2-pentanone and water. 0.145 g (0.71 mmol) of ammonium catalyst are added to give a white suspension. 3.84 ml (13.3 mmol) of 2-(3,4-epoxycyclohexyl)ethyltriethoxysilane and 0.158 ml (0.71 mmol) of tetraethylorthosilicate are added dropwise. The mixture is stirred at reflux for 48h. Then, the suspension is allowed to cool down. The upper liquid phase is removed and the polymer is rinsed with 25 ml of 4-Methyl-2-pentanone. The mixture is extracted with 15 ml of water. The resulting solution is poured slowly into 600 ml of cold tert-butyl methyl ether. The solid is filtered off and dried under vacuum to give 6.58 g of polymer.

Mw: 24265 DA (PI: 1.66)

$^1$H NMR (300 MHz) in DMSO-$d_6$: 7.96-6.5 (br., 9H), 6.44 (br., 1H), 4.80 (br., 2H), 4.09 (br., 2H), 3.58 (br., 1H), 2.62 (br., 2H), 2.1-0.9 (br., 11H), 0.61 (br, 1.9H).

Preparation of the Copolymer P29

6.75 g (19 mmol) of compound 2a, and 0.42 g (1 mmol) of cholic acid are suspended in 50 ml of 4-methyl-2-pentanone and water. 0.21 g (1 mmol) of ammonium catalyst are added to give a white suspension. 5.65 g (19 mmol) of 2-(3,4-epoxycyclohexyl)ethyltriethoxysilane are added dropwise. The mixture is stirred at reflux for 48h. Then, the suspension is allowed to cool down. The upper liquid phase is removed and the polymer is rinsed with 60 ml of 4-Methyl-2-pentanone. The organic phase was extracted 3 times with 15 ml of water. The resulting solution is poured slowly into 190 ml of cold tert-butyl methyl ether. The solid is filtered off and dried under vacuum to give 8.4 g of P29.

Mw: 69800 DA (PI:4.1)

$^1$H NMR (300 MHz) in THF-$d_8$: 8.1 (br., 2H), 7.68 (br., 3H), 7.2-6.95 (br., 4H), 6.48 (br., 1H), 4.95 (br., 1H), 4.4-3.6 (br., 3H), 2.55 (br., 2H), 2.1-1.2 (br., 11H), 0.76 (br, 2H).

Preparation of PAA-1

0.666 g (3.4 mmol) of 1,2,3,4-cyclobutanetetracarboxylic acid is added to a solution of 0.69 g (3.47 mmol) of 4-(4-aminophenoxy)aniline in 8.6 g of NMP. Stirring is then carried out at 0° C. for 2 hours. The polymer mixture is diluted with 50 mL of NMP, precipitated into 300 mL of water to yield, after drying at 40° C. under vacuum, 2.1 g of polyamic acid PAA-1 in the form of a white powder. [r]=0.40 dL/g

Preparation of PAA-2

0.69 g (3.1 mmol) of 2,3,5-tricarboxycyclopentylacetic-1,2:3,4-dianhydride is added to a solution of 1.5 g (3.1 mmol) of 4-(4-aminophenoxy)aniline in 5.1 g of NMP. Stirring is then carried out at 0° C. for 2 hours. The polymer mixture is diluted with 30 g of NMP, precipitated into 300 mL of water to yield, after drying at 40° C. under vacuum, 1.9 g of polyamic acid PAA-3 in the form of a white powder. [η]=0.40dL/g

Preparation of PAA-3 from 4,4'-ethylenedianiline 3.2 g (14.1 mmol) of 2,3,5-tricarboxycyclopentylacetic-1,2:3,4-dianhydride is added to a solution of 3 g (14.1 mmol) of 4,4'-ethylenedianiline in 35 g of NMP. Stirring is then carried out at 0° C. for 2 hours. The polymer mixture is then diluted with 47 g of acetone, precipitated into 500 mL of water to yield, after drying at 40° C. under vacuum, 6.5 g of polyamic acid PAA-5 in the form of a white powder.
[η]=0.52 dL/g Preparation of PAA-4 from 4,4'-Methylenedianiline 5.6 g (25.2 mmol) of 2,3,5-tricarboxycyclopentylacetic-1,2:3,4-dianhydride is added to a solution of 5 g (25.2 mmol) of 4,4'-methylenedianiline in 60 g of NMP. Stirring is then carried out at 0° C. for 2 hours. The mixture is subsequently allowed to react for 1 hour at room temperature. The polymer mixture is then diluted with 100 g of NMP and 78 g of acetone, precipitated into 3500 mL of water to yield, after drying at 40° C. under vacuum, 14 g of polyamic acid PAA-4 in the form of a white powder.
[η]=0.52 dL/g Preparation of PAA-5 from 4-(4-amino-2-methyl-phenyl)-3-methyl-aniline 5.6 g (25.2 mmol) of 2,3,5-tricarboxycyclopentylacetic-1,2:3,4-dianhydride is added to a solution of 5 g (25.2 mmol) of 4-(4-amino-2-methyl-phenyl)-3-methyl-aniline in 60 g of NMP. Stirring is then carried out at 0° C. for 2 hours. The mixture is subsequently allowed to react for 1 hour at room temperature. The polymer mixture is then diluted with 100 g of NMP and 78 g of acetone, precipitated into 3500 mL of water to yield, after drying at 40° C. under vacuum, 14 g of polyamic acid PAA-5 in the form of a white powder.
[η]=0.62 dL/g Preparation of PAA-6 from 4-(4-amino-2-methyl-phenyl)-3-methyl-aniline PAA-6 is prepared according to the process described for PAA-5. [r]=0.52 dL/g

APPLICATION EXAMPLES

Example 1

A liquid crystal cell is prepared wherein the liquid crystal is aligned by photo reactive P1 and the electric field is applied between two plan electrodes on each side of the cell gap.

A 8 wt % solution of polysiloxane P1 is prepared by mixing the solid P1 in NMP and stirred thoroughly till the solid is dissolved. Then a second solvent butyl cellusolve (BC) is added and the whole composition is stirred thoroughly to obtain final solution. The solvent ratio between NMP and butyl cellulose is 1:1. The above polymer solution was spin-coated onto the two ITO coated glass substrates at a spin speed of 2500 rpm for 30 seconds. After spin coating the substrates are subjected to baking procedure consisting of pre-baking for 1.5 minutes at 130° C. and post-baking for 40 minutes at a temperature of 200° C. The resulting layer thickness is around 95-100 nm. The substrates with the coated polymer layer on top are exposed to linearly polarized UV light (LPUV) at an incidence angle of 0° relative to the normal of the substrate surface. The plane of polarization was within the plane spanned by the substrate normal and the propagation direction of the light. The applied exposure dose is 100 mJ/cm². After LPUV exposure, a cell is assembled with the 2 substrates, the exposed polymer layers facing to the inside of the cell. The substrates are adjusted relative to each other such that the induced alignment directions are parallel to each other. The cell is capillary filled with liquid crystal MLC7067 (Merck KGA), which had a positive dielectric anisotropy. After that, the cell is optionally annealed at about 92° for 10 minutes and slowly cooled down to room temperature. Alignment quality of the liquid crystal in the cell is checked by placing the cell between two crossed polarizers and adjusted to obtain dark state. The alignment quality is defined to be good, if the dark state show no defects and the liquid crystal is well oriented. The alignment quality is defined to be medium if the dark state has light leakage because of slight inhomogeneous orientation of liquid crystal in some areas of the cell. The alignment quality is defined to be worse, if liquid crystal is not oriented with absence of dark state.

The liquid crystal in the cell showed well defined and homogeneous planar orientation before and after thermal annealing of the cell. A tilt angle below 0.2° is measured using the rotating analyzer method from Shintech.

Example 1a

A liquid crystal cell is prepared according to the process described in example 1 except that an incidence angle of 40° relative to the normal of the substrate surface is used for the linearly polarized UV. The liquid crystal in the cell showed well defined and homogeneous planar orientation before and after thermal annealing of the cell. A tilt angle of about below 0.20 is measured using the rotating analyzer method from Shintech.

Example 2

Cells are prepared with P3, P9, P5, P14, P17, P19P25, P28 according to the process described for example 1. The liquid crystal in the cell showed well defined and homogeneous planar orientation before and after thermal annealing of the cell. Tilt angles of below 0.2° are measured using the rotating analyzer method from Shintech.

Example 3

The image sticking of the cells made in example 1 and 2 were measured. The image sticking of an IPS cell is measured by using an Optipro-250 from Shintech. A wavelength of 589 nm is used. The unbiased sample, consisting of 2 independent pixels, is placed between the crossed polarizers with the alignment direction of the sample being parallel to the first polarizer. The Voltage-Transmittance curve of both pixels is measured by applying 60 Hz square wave voltage in order to find the voltage amplitude $V_{100}$ for maximum transmittance $T_{100}$ and the voltage amplitude V, at which a transmittance of 1% of $T_{100}$ is reached ($T_1[0]$). A 60 Hz square wave voltage with an amplitude $V_{100}$ is applied to the first pixel (called measurement pixel) for a time period of 24 hours while the second (reference) pixel remains unbiased. The sample is stored protected from light and at room temperature during this time. After 24 hours the transmittances $T_1[24h]$ are measured again for both pixels by using the same voltages $V_1$. The image sticking of the sample is $$\text{Image sticking (24 h)} = \frac{T_1^M(24\ h)}{T_1^M(0\ h)} \times \frac{T_1^R(0\ h)}{T_1^R(24\ h)} \times 100\%$$

where M refers to the measurement pixel and R refers to the reference pixel. The image sticking of a cell is considered very good for values below 110%, good for values between 110% to 120% and medium for values above 120%.

| Polymer | Image sticking (%) |
|---------|-------------------|
| P1      | Very good         |
| P5      | Very Good         |
| P9      | Good              |
| P17     | Very good         |
| P3      | Medium            |
| P14     | Medium            |

Example 4

The alignment quality of the cells from example 1 and example 2 are quantified by contrast ratio (CR). The contrast of an unbiased IPS cell is determined by measuring its light leakage using a transmission microscope consisting of a backlight, polarizer and analyzer, optics (condenser lenses, microscope objective) between the polarizers and a photo-multiplier to measure the transmitted light power. As a light source an LED backlight from ELDIM is used, which is similar to the backlight from commercial displays. The measurement area in the focal plane (sample) of the microscope objective is about 1 mm$^2$.

Without sample the polarizers from the microscope are brought to the perpendicular position (the detector signal displays a minimum value). The unbiased sample is placed under the microscope objective and rotated in-plane until the detector displays a minimum value $V_0$ (the alignment direction of the cell is parallel to the polarizer). By keeping the in-plane position of the sample, the analyzer is rotated by 90° (until the detector displays a maximum value $V_{mrrax}$. The contrast of the sample is $CR=V_{max}/V_0$. If CR is below 1000 the contrast is said "bad", if CR is between 1000 and 2000 CR is "medium", if CR is between 2000-3000 contrast is said "good" and if CR is above 3000 CR is said "very good".

| Polymer | CR        |
|---------|-----------|
| P1      | Good      |
| P3      | Good      |
| P4      | Good      |
| P5      | Good      |
| P9      | Very Good |
| P7      | Bad       |
| P14     | Good      |
| P17     | Medium    |
| P19     | Medium    |

Example 5

A cell is prepared as in example 1, except that the solution to be coated comprised polysiloxane P1 and the polyamic acid PAA-1 in ratio of 10:90 per weight % to form a blend composition. A 6.4% solution is prepared as for the procedure explained in example 1 except that the two polymers were mixed in the solvent at the same time and the spin speed used is 3800 rpm for 30 seconds. The liquid crystal in the cell showed well defined and homogeneous planar orientation before and after thermal annealing of the cell. A tilt angle of about 0.01° is measured using the rotating analyzer method.

Example 6

A cell is prepared as in example 1, except that the solution to be coated comprised a polysiloxane P1 and the polyamic acid PAA-2 in ratio of 10:90 per weight % to form a blend composition. The liquid crystal in the cell showed well defined and homogeneous planar orientation before and after thermal annealing of the cell. A tilt angle below 0.1° is measured using the rotating analyzer method.

Example 6b

A cell is prepared as in, except that the solution to be coated comprised a polysiloxane P1 and the polyamic acid PAA-4 in ratio of 10:90 per weight % to form a blend composition. The liquid crystal in the cell showed well defined and homogeneous planar orientation before and after thermal annealing of the cell. A tilt angle below 0.1° is measured using the rotating analyzer method.

Example 6c

A cell is prepared as in, except that the solution to be coated comprised a polysiloxane P1 and the polyamic acid PAA-5 in ratio of 10:90 per weight % to form a blend composition. The liquid crystal in the cell showed well defined and homogeneous planar orientation before and after thermal annealing of the cell. A tilt angle below 0.1° is measured using the rotating analyzer method.

Example 6d

A cell is prepared as in, except that the solution to be coated comprised a polysiloxane P1 and the polyamic acid PAA-6 in ratio of 10:90 per weight % to form a blend composition. The liquid crystal in the cell showed well defined and homogeneous planar orientation before and after thermal annealing of the cell. A tilt angle below 0.1° is measured using the rotating analyzer method.

Example 7

Cells are prepared as in example 5 except that the solution to be coated comprised instead of P1 the polysiloxane P24, P21, P7, P14, P22, P23, P20, P26, P27, P31, P32, P33, P34, P36. The liquid crystal in the cells showed well defined and homogeneous planar orientation before and after thermal annealing of the cell.

Example 7a

Cells are prepared as in example 5 except that the applied exposure dose is 500 mJ/cm$^2$ and the solution to be coated comprised instead of P1 the polysiloxane P35, P30. The liquid crystal in the cells showed well defined and homogeneous planar orientation before and after thermal annealing of the cell.

Example 8

The image sticking of the cells prepared in example 5, 6, 6b, 6c, 6d and 7, 7a were determined by using the same method described for example 3

| Blend    | Image sticking |
|----------|---------------|
| P1/PAA-1 | Very Good     |
| P1/PAA-2 | Very Good     |
| P1/PAA-5 | Very Good     |
| P1/PAA-6 | Medium        |
| P7/PAA-1 | Medium        |

-continued

| Blend | Image sticking |
|---|---|
| P14/PAA-1 | Good |
| P24/PAA-1 | Very Good |
| P21/PAA-1 | Very good |
| P22/PAA-1 | Good |
| P23/PAA-1 | Good |
| P26/PAA-1 | Very good |
| P27/PAA-1 | Medium |
| P30/PAA-1 | Good |
| P31/PAA-1 | Good |
| P32/PAA-1 | Good |
| P33/PAA-1 | Medium |
| P35/PAA-1 | Medium |
| P36/PAA-1 | Medium |
| P29/PAA-1 | Very good |

Example 9

The contrasts of the cells prepared in example 5, 6, 6b, 6c, 6d, 7 and 7a were determined by using the same method described for example 4

| Blend | CR |
|---|---|
| P1/PAA-1 | Very good |
| P1/PAA-5 | Very Good |
| P1/PAA-6 | Very good |
| P7/PAA-1 | Good |
| P14/PAA-1 | Very good |
| P24/PAA-1 | Medium |
| P20/PAA-1 | Medium |
| P21/PAA-1 | Very good |
| P22/PAA-1 | Medium |
| P23/PAA-1 | Good |
| P26/PAA-1 | Medium |
| P27/PAA-1 | Medium |
| P30/PAA-1 | Good |
| P31/PAA-1 | Good |
| P32/PAA-1 | Very good |
| P33/PAA-1 | Very Good |
| P35/PAA-1 | Medium |
| P36/PAA-1 | Good |
| P29/PAA-1 | Very good |

Example 10

Voltage holding ratio (VHR) of the cells from example 7 was measured at room temperature using LCM-1 instrument from Toyo, Japan. The VHR was measured using a short and a long frame period (T). In the short one, the voltage decay V (at T=20 ms) of a voltage surge of 64 μs with $V_0$ (V at t=0)=5V is then measured over a period of T=20 ms. In the long one, the voltage decay V (at T=1667 ms) of a voltage surge of 64 μs with $V_0$ (V at t=0)=1V is then measured over a period of T=1667 ms. The voltage holding ratio is then determined, at room temperature, given by integration of the measurement curve between $V_0$ and V weighted by the area in the case of 100% VHR. The results show VHR ≥99% for all tested cells.

The invention claimed is:

1. A siloxane polymer formed from at least the monomer of formula (I):

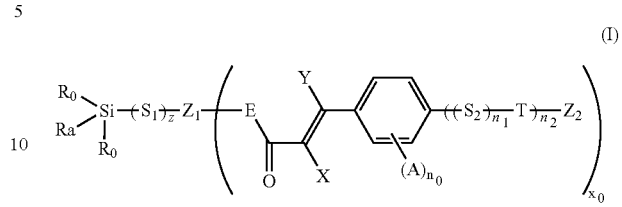

wherein
$R_a$ represents OH, Cl, substituted or unsubstituted alkoxyl group having 1 to 20 carbons, alkyl group having 1 to 20 carbons, or aryl group having 1 to 20 carbons;
$S_1$ represents a substituted or unsubstituted $C_1$-$C_{24}$ straight chain alkylene;
z is an integer from 0 to 15;
$Z_1$ represents a substituted or unsubstituted $C_5$-$C_6$ alicyclic group;
$n_0$ is an integer from 0 to 4;
$n_1$ is an integer from 0 to 15;
$n_2$ is an integer from 1 to 15;
$x_0$ is an integer from 1 to 2;
X, Y are H;
$S_2$ represents a cyclic, aromatic, straight-chain or branched, substituted or unsubstituted $C_1$-$C_{24}$alkylene in which one or more —C—, —CH—, —CH$_2$— groups may be replaced by a linking group;
E represents O, S, or NH;
A represents halogen, H or substituted or unsubstituted $C_1$-$C_{24}$ alkyl, a substituted or unsubstituted $C_1$-$C_{24}$ alkenyl, a substituted or unsubstituted $C_1$-$C_{24}$ alkynyl, or a carboxylic acid, $C_1$-$C_{24}$ alkoxy, wherein one or more, —C—, —CH—, —CH$_2$—, group may independently from each other be replaced by a heteroatom;
$R_0$ represents OH, Cl, a linear or branched, substituted or unsubstituted alkoxyl group having 1 to 20 carbons, wherein one or more, —C—, —CH—, —CH$_2$-, could be replaced by unsubstituted or substituted $C_6$-$C_{20}$ aryl group;
$Z_2$ is $C_1$-$C_6$ alkoxy or nitrile; and
T represents an unsubstituted or substituted, straight-chain $C_1$-$C_{16}$alkylene.

2. The siloxane polymer according to claim 1, wherein $R_a$, z, $n_1$, $n_2$, $x_0$, $S_2$, $R_0$, T, $Z_1$, $S_1$, E, X, Y, and $Z_2$ are as described above; and
A represents H, one or more halogens, one or more methoxy groups or one or more carboxylic groups.

3. The siloxane polymer according to claim 1, wherein $R_a$, z, $n_1$, $n_2$, $x_0$, $S_2$, $R_0$, T, $Z_1$, $S_1$, X, Y, and $Z_2$ are as described above; and
A represents H, one or more halogens, one or more methoxy groups or one or more carboxylic groups; and
E represents O.

4. The siloxane polymer according to claim 1, wherein $R_a$, z, $n_1$, $n_2$, $x_0$, $S_2$, $R_0$, $Z_2$, T, X, Y, and $Z_2$ are as described above; and
A represents H, one or more halogens, one or more methoxy groups or one or more carboxylic groups;
$Z_1$ is a substituted or unsubstituted cyclohexanol group or substituted or unsubstituted cyclohexanether group;
$S_1$ is ethyl group; and
E is O.

5. The siloxane polymer according to claim 1, wherein the siloxane polymer is a siloxane copolymer formed from the monomer of formula (I).

6. A composition comprising at least one first siloxane polymer according to claim 1 and a second polymer, which is not identical to the first siloxane polymer, and optionally an additive.

7. A composition comprising at least one first siloxane polymer according to claim 1 and a second polymer, which is polyamic acid or polyimide, and optionally an additive.

8. A process for preparing a linear, branched or cross-linked siloxane polymer according to claim 1 comprising the steps of:
  i. reacting at least one compound selected from the group consisting of siloxane monomers, polymers and oligomers comprising or formed from the monomer of formula (II)

$$R_0\text{-Si}(\text{-S}_1\text{-})_z\text{-Z}_3 \quad (II)$$
with $R_a$ and $R_0$ on Si wherein
$R_a$ represents OH, Cl, substituted or unsubstituted alkoxyl group having 1 to 20 carbons, alkyl group having 1 to 20 carbons, or aryl group having 6 to 20 carbons;
$R_0$ represents OH, Cl, a linear or branched, substituted or unsubstituted alkoxyl group having 1 to 20 carbons, in which a C, CH could be replaced by unsubstituted or substituted $C_6$-$C_{20}$ aryl group;
$S_1$ represents a substituted or unsubstituted $C_1$-$C_{24}$ straight chain alkylene;
z is an integer from 0 to 15;
$Z_3$ represents substituted or unsubstituted cyclic group of $C_3$ to $C_{12}$ having an epoxy group
with another compound of formula (III)

$$\text{(III)}$$

wherein
$E_1$ represents an OH, SH, or $NH_2$;
X, Y are H;
A represents substituted or unsubstituted $C_1$-$C_{24}$ alkyl, a substituted or unsubstituted $C_1$-$C_{24}$ alkenyl, a substituted or unsubstituted $C_1$-$C_{24}$ alkynyl, wherein one or more, —C—, —CH—, —CH$_2$-, group may independently from each other be replaced by a heteroatom;
$S_2$ represents a cyclic, aromatic, straight-chain or branched, substituted or unsubstituted $C_1$-$C_{24}$alkylene in which one or more —C—, —CH—, —CH$_2$— groups may be replaced by a linking group;
$n_1$ is an integer from 0 to 15;
$n_2$ is an integer from 1 to 15;
$Z_2$ is $C_1$-$C_6$ alkoxy or nitrile; and
T represents an unsubstituted or substituted, straight-chain $C_1$-$C_{16}$alkylene,
in the presence of an organic solvent and a catalyst;
  ii. optionally reacting the product obtained by step i) with a $C_1$-$C_{24}$ linear, branched or cyclic alcohol wherein one or more C, CH, CH$_2$ group(s) may be independently from each other be replaced by a linking group, under the presence of a base; and
  iii. isolating and purifying the obtained product.

9. A siloxane polymer obtainable by the process according to claim 8.

10. An orientation layer, comprising at least one siloxane polymer according to claim 1.

11. A method of using an orientation layer, comprising orienting liquid crystals with the orientation layer of claim 10.

12. A method according to claim 11, wherein the orientation of liquid crystals is a planar alignment.

13. A method of using an orientation layer, comprising aligning
  i. liquid crystal composition comprising one or more polymerizable liquid crystal monomers, or comprising one or more liquid crystal polymers or oligomers, which are the polymerized form of said polymerizable liquid crystal monomers, and/or
  ii. liquid crystal compositions comprising one or more polymerizable liquid crystal monomers, or comprising one or more liquid crystal polymers or oligomers, which are the polymerized form of said polymerizable liquid crystal monomers, said liquid crystal compositions being sandwiched between a pair of said orientation layers
with the orientation layer of claim 10.

14. Optical or electro-optical unstructured or structured elements, comprising at least one linear, branched or cross-linked polymer according to claim 1.

15. The siloxane polymer according to claim 1, wherein $S_1$ represents a substituted or unsubstituted $C_1$-$C_2$ straight chain alkylene.

16. The method according to claim 8, wherein Si represents a substituted or unsubstituted $C_1$-$C_2$ straight chain alkylene.

17. The optical or electro-optical unstructured or structured elements according to claim 14, wherein the optical or electro-optical unstructured or structured elements are selected from the group consisting of liquid crystal display cells, multi-layer elements and hybrid layer elements.

18. The siloxane polymer according to claim 1, wherein $Z_2$ represents nitrile.

19. The siloxane polymer according to claim 1, wherein $Z_2$ represents $C_1$-$C_6$ alkoxy.

* * * * *